US010318964B2

(12) United States Patent
Shaw et al.

(10) Patent No.: US 10,318,964 B2
(45) Date of Patent: *Jun. 11, 2019

(54) SYSTEMS AND METHODS FOR DETECTING ENTITY MIGRATION

(71) Applicant: LexisNexis Risk Solutions FL Inc., Boca Raton, FL (US)

(72) Inventors: Jesse C P B Shaw, Saint Cloud, MN (US); Johannes Philippus de Villiers Prichard, Boynton Beach, FL (US); Eric Blood, Cumming, GA (US); Andrew John Bucholz, Alexandria, VA (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/248,244

(22) Filed: Aug. 26, 2016

(65) Prior Publication Data

US 2017/0061446 A1    Mar. 2, 2017

Related U.S. Application Data

(60) Provisional application No. 62/210,601, filed on Aug. 27, 2015.

(51) Int. Cl.
| | |
|---|---|
| *G06Q 30/00* | (2012.01) |
| *G06F 16/26* | (2019.01) |
| *G06F 16/2458* | (2019.01) |
| *G06Q 20/40* | (2012.01) |
| *G06F 21/31* | (2013.01) |
| *H04W 12/06* | (2009.01) |
| *H04W 12/12* | (2009.01) |

(52) U.S. Cl.
CPC ..... *G06Q 30/0185* (2013.01); *G06F 16/2465* (2019.01); *G06F 16/26* (2019.01)

(58) Field of Classification Search
CPC combination set(s) only.
See application file for complete search history.

(56) References Cited

U.S. PATENT DOCUMENTS

| | | | | |
|---|---|---|---|---|
| 8,682,755 | B2 * | 3/2014 | Bucholz | G06Q 50/265 705/19 |
| 2013/0333048 | A1 * | 12/2013 | Coggeshall | H04L 63/12 726/26 |

\* cited by examiner

*Primary Examiner* — Mark A Fleischer
(74) *Attorney, Agent, or Firm* — Troutman Sanders LLP; James E. Schutz; Mark Lehi Jones

(57) ABSTRACT

Systems and methods are disclosed herein for detecting entity migration. A method is provided for receiving container information for all known addresses in the United States. The container information can include address records, person or business entities associated with the address records, and temporal information associating the entities with the address records. The method includes determining, with one or more special-purpose computer processors in communication with a memory, migration data based on the container information. The method includes extracting metrics from the migration data. The metrics can include velocity of migration data; simultaneous movement of individuals within a predetermined time period; distance moved; and/or age of the person or business entities. The method can include determining, based at least in part on outliers associated with the metrics, one or more indicators of fraud; and outputting, for display, the one or more indicators of the fraud.

20 Claims, 9 Drawing Sheets

SYSTEMS AND METHODS FOR DETECTING ENTITY MIGRATION

CROSS REFERENCE TO RELATED APPLICATIONS

This application claims priority under 35 U.S.C. 119 to U.S. Provisional Patent Application No. 62/210,601, entitled "Systems and Methods for Detecting Entity Migration" filed 27 Aug. 2015, the contents of which are incorporated by reference in their entirety as if fully set forth herein.

FIELD OF THE DISCLOSED TECHNOLOGY

The disclosed technology generally relates to detecting entity migration, and in particular, to systems and methods for detecting anomalous patterns relating individuals or businesses and their associated addresses over time.

BACKGROUND OF THE DISCLOSED TECHNOLOGY

Businesses and governmental agencies face a number of growing problems associated with fraudulent activities that have proven very difficult to detect and stop. Such activities can include identity-related fraud such as identity theft, account takeover, and/or synthetic identity creation. Fraudsters, for example, can apply for credit, payments, benefits, tax refunds, etc. by misrepresenting their identity as another adult, a child, or even a deceased person. The associated revenue loss to the businesses and/or government agencies can be significant, and the technical and emotional burden on the victim to rectify their public, private, and/or credit records can be onerous.

Identity theft, for example, can occur when an individual's identity is used by another person for personal gain. In certain cases, by the time such fraudulent activity is discovered, the damage has already been done and the perpetrator has moved on. Technically well-informed fraud perpetrators with sophisticated deception schemes are likely to continue developing, refining, and applying fraudulent schemes, particularly if fraud detection and prevention mechanisms are not in place.

BRIEF SUMMARY OF THE DISCLOSED TECHNOLOGY

Some or all of the above needs may be addressed by certain embodiments of the disclosed technology. Certain embodiments of the disclosed technology may include systems and methods for detecting anomalous activity related to entity migration and associated data.

According to an example embodiment of the disclosed technology, a method is provided for determining a likelihood of identity theft. The method can include receiving, from one or more sources, container information for all known addresses in the United States. The container information can include address records, person or business entities associated with the address records, and temporal information associating the entities with the address records. The method includes determining, with one or more special-purpose computer processors in communication with a memory, migration data based on the container information. The method further includes extracting metrics from the migration data. The metrics can include one or more of: velocity of migration data; simultaneous movement of individuals within a predetermined time period; distance moved; and age of the person or business entities. The method can include determining, with the one or more special-purpose computer processors, and based at least in part on outliers associated with the metrics, one or more indicators of fraud; and outputting, for display, the one or more indicators of the fraud. In certain example implementations, the fraud may relate to identity theft fraud.

According to an example embodiment of the disclosed technology, a system is provided. The system includes at least one memory for storing data and computer-executable instructions; and at least one special-purpose processor configured to access the at least one memory and further configured to execute the computer-executable instructions to: receive, from one or more sources, container information for all known addresses in the United States, the container information comprising: address records; person or business entities associated with the address records; and temporal information associating the person or business entities with the address records. The system is configured to determine migration data based on the container information; extract metrics from the migration data, the metrics comprising one or more of: velocity of migration data; simultaneous movement of individuals within a predetermined time period; distance moved; and age of the person or business entities. The system is further configured to determine, based at least in part on outliers associated with the metrics, one or more indicators of fraud; and output, for display, the one or more indicators of the fraud.

According to an example embodiment of the disclosed technology, a computer-readable media comprising computer-executable instructions is provided. When executed by one or more processors, configure the computer-executable instructions cause the one or more processors to perform the method of: receiving, from one or more sources, container information for all known addresses in the United States. The container information can include address records, person or business entities associated with the address records, and temporal information associating the entities with the address records. The method includes determining, with one or more special-purpose computer processors in communication with a memory, migration data based on the container information. The method further includes extracting metrics from the migration data. The metrics can include one or more of: velocity of migration data; simultaneous movement of individuals within a predetermined time period; distance moved; and age of the person or business entities. The method can include determining, with the one or more special-purpose computer processors, and based at least in part on outliers associated with the metrics, one or more indicators of fraud; and outputting, for display, the one or more indicators of the fraud. In certain example implementations, the fraud may relate to identity theft fraud.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
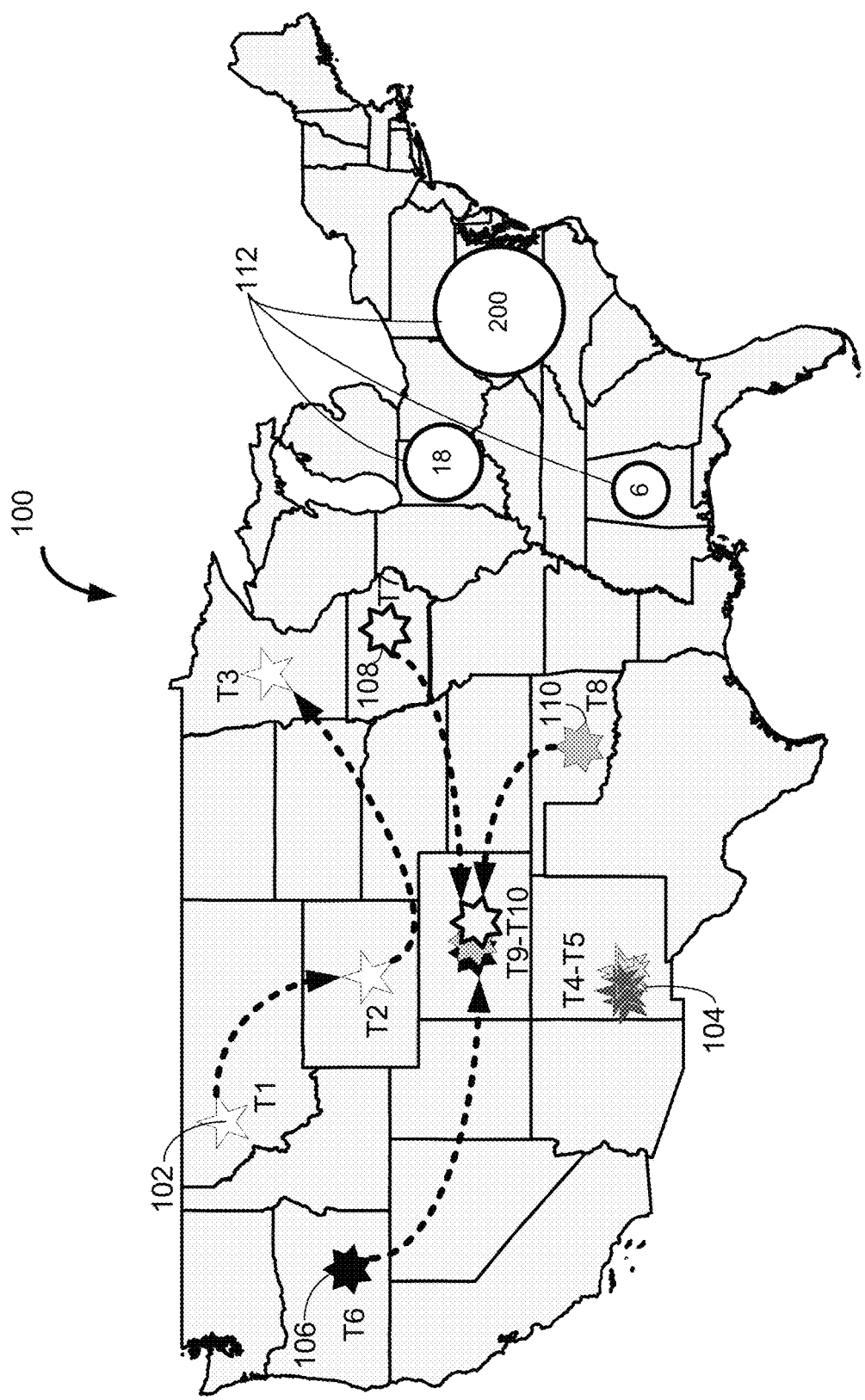
FIG. 1 is a diagram 100 of an illustrative entity migration and crowding example, according to certain embodiments of the disclosed technology.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

According to certain example implementations of the disclosed technology, certain anomalous or suspicious activity may be detected by monitoring, tracking, processing, and/or analysis of certain migration and/or crowding data. For example, migration data may represent individuals and their associated addresses over time. In certain example implementations, the term "crowding" as used herein may be used to indicate too many people living at a single address. In certain example implementations, the term "crowding" as used herein may be used to indicate a physically impossible number of people living at a single address. In certain example implementations, the term "crowding" as used herein may be used to indicate too low of a ratio for square footage per person at a given address. Example implementations of the disclosed technology can utilize special-purpose computing systems and custom query language(s) in the processes described herein to provide meaningful results, as may be necessitated due to the sheer amount of data that needs to be tracked and analyzed.

According to certain example implementations of the disclosed technology, crowding or the "crowding effect" may be utilized to identify and/or distinguish possible fraud-related activity from normal activity associated with an entity or identity. The crowding effect, for example, may occur when multiple identities move to (or appear at) a new location within the same time-period. In certain example implementations, the crowding effect may be used to distinguish between fraudulent and non-fraudulent activity. For example, a person may fake an identity for non-fraudulent activities, such as to get a job or to move into an apartment, and such identity faking may not elicit detection of a crowding effect because if its isolated nature and typical involvement of only one identity. However, a fraudster who creates (or steals) multiple identities to commit fraudulently activity en-masse could use a same or similar address for the identities, and certain implementations of the disclosed technology may be utilized to detect such activity.

Certain example implementations of the disclosed technology may measure entity crowding over time. For example, an entity identifier (such as a universal entity identifier or similar record identifier) may be time-stamped to measure a number of months the entity remains at a geo-location or address. Certain example implementations of the disclosed technology may measure or track the entity/address association based on a given threshold of time.

Certain example implementations of the disclosed technology provide tangible improvements in computer processing speeds, memory utilization, and/or programming languages. Such improvements provide certain technical contributions that can enable the detection of anomalous activity associated with migration data. In certain example implementations, the improved computer systems disclosed herein may enable migration tracking and analysis of an entire population, such as all known persons in the United States, together with all associated addresses. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective anomaly detection at the scale envisioned herein. As disclosed herein, the special-purpose computers and special-purpose programming language can provide improved computer speed and/or memory utilization that provide an improvement in computing technology, thereby enabling the disclosed inventions.

Certain example implementations of the disclosed technology may be enabled by the use of a new programming language known as KEL (Knowledge Engineering Language), which was developed by the Applicant. Certain embodiments of the KEL programming language may be configured to operate on the specialized HPCC Systems, as developed and offered by LexisNexis Risk Solutions, Inc., the Assignee and Applicant of the disclosed technology. HPCC Systems, for example, provide data-intensive super-computing platform(s) designed for solving big data problems. As an alternative to Hadoop, the HPCC Platform offers a consistent, single architecture for efficient processing. The KEL programming language, in conjunction with the HPCC Systems, provides technical improvements in computer processing that enable the disclosed technology and provides useful, tangible results that may have previously been unattainable. For example, certain example implementation of the disclosed technology may rely upon geo-distance calculations, which are computationally intensive, requiring special software and hardware. Example implementations of the disclosed technology can utilize special-purpose computing systems and custom query language(s) in the processes described herein to provide meaningful results, as may be necessitated due to the sheer amount of data that needs to be tracked and analyzed.

Certain example implementations of the disclosed technology may be enabled by the use of a special purpose HPCC systems in combination with a special purpose software linking technology called Scalable Automated Linking Technology (SALT). SALT and HPCC, are developed and offered by LexisNexis Risk Solutions, Inc., the assignee of the disclosed technology. HPCC Systems, for example, provide data-intensive supercomputing platform(s) designed for solving big data problems. As an alternative to Hadoop, the HPCC Platform offers a consistent, single architecture for efficient processing. The SALT modules, in conjunction with the HPCC Systems, provides technical improvements in computer processing that enable the disclosed technology and provides useful, tangible results that may have previously been unattainable. For example, certain example implementation of the disclosed technology may process massive data sets, which are computationally intensive, requiring special software and hardware.

Certain example implementations of the disclosed technology may involve processing massive data sets and managing the required large amount of memory/disk space. One of the technical solutions provided by the technology disclosed herein concerns the enablement and efficiency improvement of computer systems and software to process relationship data, and to provide the desired data in a reasonable amount of time. Certain example implementations of the disclosed technology may be utilized to increase the efficiency of detection of migration indicators.

Determining relationships among records, for example, can follow the classical n-squared process for both time and disk space. According to an example implementation of the disclosed technology, SALT provides a process in which light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition, SALT provides a general data ingest application, which allows input files to be combined or merged with an existing base file. SALT may be used to generate a parsing and classification engine for unstructured data, which can be used for data preparation. The data preparation steps are usually followed by the actual record linking or clustering process. SALT provides applications for several different types of record linking including internal, external, and remote.

Data profiling, data hygiene and data source consistency checking, while key components of the record linking process, have their own value within the data integration process, and may be supported by SALT for leverage even when record linking is not a necessary part of a particular data work unit. SALT uses advanced concepts such as term specificity to determine the relevance/weight of a particular field in the scope of the linking process, and a mathematical model based on the input data, rather than the need for hand coded user rules, which may be key to the overall efficiency of the method. SALT may be used to verify identities, addresses and other factors, and using information on relationships to determine migration indicators.

In accordance with an example implementation, a measure of crowding may include a count of unique entities at a given location. In certain example implementations, the entity address/location data may be analyzed to measure additional crowding-related metrics, such as (1) the velocity at which entities appear at a location; (2) the distance from the entity's previously associated location; (3) the number of entities moving simultaneously; and/or (4) the age of the entity as they emerge at a location. In certain example implementations, the entity crowding metrics may be calculated via graph analytics with the Knowledge Engineering Language (KEL) as previously discussed, which may provide certain speed, efficiency, and/or memory utilization advantages over previous computation languages.

In accordance with certain example implementations of the disclosed technology, the measurement and analysis of identity migration and/or crowding can be used to identify addresses that may be under the control of criminals. For example, criminals may steal and/or manufacture a large number of identities, and a portion of these identities may be associated with a same address for which the criminals may have access or control.

In certain example implementations of the disclosed technology, "containers" may be created to store each address, and each address container may be monitored or analyzed over time, for example, as people move in and out of the address. Certain example implementations of the disclosed technology can enable review of all known addresses of the entire U.S. population, measuring and tracking identities moving in and out of the addresses, and generating statistics.

At a high level, the disclosed technology may generate and utilize metrics to look at identities and their associated flow to/from addresses over time. Certain example implementations, may also look at how far people move to go from one address to another. In certain instances, people may not have a logical movement pattern. The disclosed technology may help gain a better understanding the movement of the entire population, not only in the U.S. but also abroad.

Certain example implementations of the disclosed technology may be utilized to detect when a large number of people move to an address at once. Such movement data may be indicative of fraud. But there are also situations in which such data may represent non-fraudulent activity, such as a credit repair agency using its address for its clients, for example. In health care for example, there may be a tie between moving and increase or decrease in allergies, thus, there is a situations in which people move en mass for health or seasonal reasons. However, certain example implementations may be utilized to detect indicators of large scale identity theft, for example as associated with governmental benefits, tax returns, Medicaid, credit abuse, etc., and such detection may be associated with people moving into the same address.

According to certain example implementation of the disclosed technology, a maximum distance that an individual has ever moved may be utilized, for example, to determine anomalous behavior when an individual shows up as moving a great distance, as previous movement patterns may be indicators for future movement. One metric that may be monitored in certain example implementation is the length in which an entity has stayed at a previous address. Utilizing this information can provide an early warning sign so that the anomalous behavior may be investigated and stopped before fraud damage can be done. In certain cases, it can take months for law enforcement or credit agencies to piece together data that would indicate fraudulent activity, and it is usually too late as the damage/theft may have already occurred.

Certain example implementations of the disclosed technology may provide cross checks and filtering to eliminate false positives. For example, military personnel may have a very high move-to distance, but college students may have a very low move-to distance. Certain example implementations of the disclosed technology may identify and flag certain groups of people to differentiate what may be normal for one group, but abnormal for another group. Certain example implementations can be utilized to spot the anomalies, either because of the distances moved, groups moving together, threshold settings, etc.

In accordance with an example implementation of the disclosed technology, individuals may be identified by a disambiguated entity identifier, including a year and month in which they show up in a public record at a particular address. In certain example implementations, the address may also be identified with a year and a month. In certain example implementations, the data may be analyzed together with all other address/individual data and the resulting output may be an indication of anomalous behavior. For example, if a family moves, they will typically do it all at once, but some of the people may be more prompt than others in updating records associated with the new local Department of Motor Vehicles. The fact that such information may not update all at once for an entire family may be indicative of normal behavior.

Certain example implementations of the disclosed technology may be utilized to detect large scale ID theft. For example, in one example implementation, all residential addresses metrics may be processed and reviewed for outliers. For example, outliers may be determined as corresponding to data that is more than two standard deviations away from the statistical normal. In other example implementations, the threshold for the outliers may be set as desired to include or exclude certain data.

Certain example implementations of the disclosed technology may be utilized as an early detection mechanism. For example, data associated with known identity theft in the past may be utilized as a model for predicting patterns that may be indicative of future identity theft. For example, a known dead person who shows up in the data as migrating may be labeled as a Zombie, and as such, will almost certainly be related with fraudulent identity theft activity. Other indicators of fraud may include a high number of individuals (>100 for example) who applied for credit in the same day from a same address. Example implementations of the disclosed technology may be utilized to identify such activity.

FIG. 1 is a diagram 100 of an illustrative entity migration and crowding example, according to certain embodiments of the disclosed technology. As described above, entity migration data may be processed to determine certain aspects, metrics, scoring, etc., as associated with the entity, the time-frame of the migration, other entities moving to a same location, etc. For example, a first entity 102 (as depicted by the white star in FIG. 1) may be associated with a first address in Montana at a first time T1, a second address in Wyoming at a second time T2, and a third address in Minnesota at a third time T3. Based on this information, a pattern of entity migration may be determined. Such information alone may or may not provide an indication of potential fraud.

In another example implementation, the disclosed technology may be utilized to detect a first plurality of entities 104 (as depicted by dark stars located in New Mexico) that emerge at a same or similar location within a given time-frame. For example, the first plurality of entities 104 may emerge at a certain address between times T4 and T5. In some instances, these entities 104 may not have an associated previous address. One explanation for the sudden emergence of the plurality of entities 104 at this location may be that a family of legal immigrants moved to the address within a given time-frame. However, if corroborating information is not available (for example from U.S. Immigrations and Customs Enforcement or other previous entity records), then it may be likely that the plurality of entities 104 may be synthetically generated for fraudulent purposes. Yet in other example implementations, it may be possible to determine that these entities appeared to "emerge" at a given address because they started a first job in the U.S. without a prior public record. In accordance with an example implementation of the disclosed technology, age may be used to determine abnormal emergence. For example, in the case of migrant or foreign workers, the age at emergence is typically higher than that of a natural citizen.

In yet another example, and with continued reference to FIG. 1, a third entity 106 may be associated with an address in Oregon at a time T6; a forth entity 108 may be associated with an address in Iowa at a time T7; and a fifth entity 110 may be associated with an address in Oklahoma at a time T8. Then, each of these entities 106, 108, 110 may be associated with a same address in Colorado between times T9 and T10. Certain example implementations of the disclosed technology may be utilized to determine entity migration metrics for these entities. For example, and depending on certain metrics, the address in Colorado may be a school dormitory or apartment in a college town, each of the entities may be of typical college age, and they may "show up" at the destination address in Colorado at a time-frame between T9 and T10 which may correspond to a beginning of a school year. In such an example, and depending on the analysis of the associated metrics, such migration behavior may be scored with a low probability of fraud. However, in other example situations, the metrics associated with the migrating entities may not fit such a safe scenario, such as students moving to go to college. For example, the entity ages may not fit the typical college student age, and thus, may be suspect.

FIG. 1 also depicts another way of graphically representing entity migration data that has been identified by the disclosed systems and methods as being suspicious or possibly fraudulent. For example, bubbles 112 may be utilized to represent possible fraudulent activity associated with entity migration and/or crowding. For example, a large number of entities may emerge at a given address. In certain example implementations, the diameter (or other numerical notations) associated with the bubbles 112 may represent the score of the likelihood of fraud. In certain example implementations, various metrics may be combined to provide indications or scores of the possible fraudulent activity.

Figure 2:
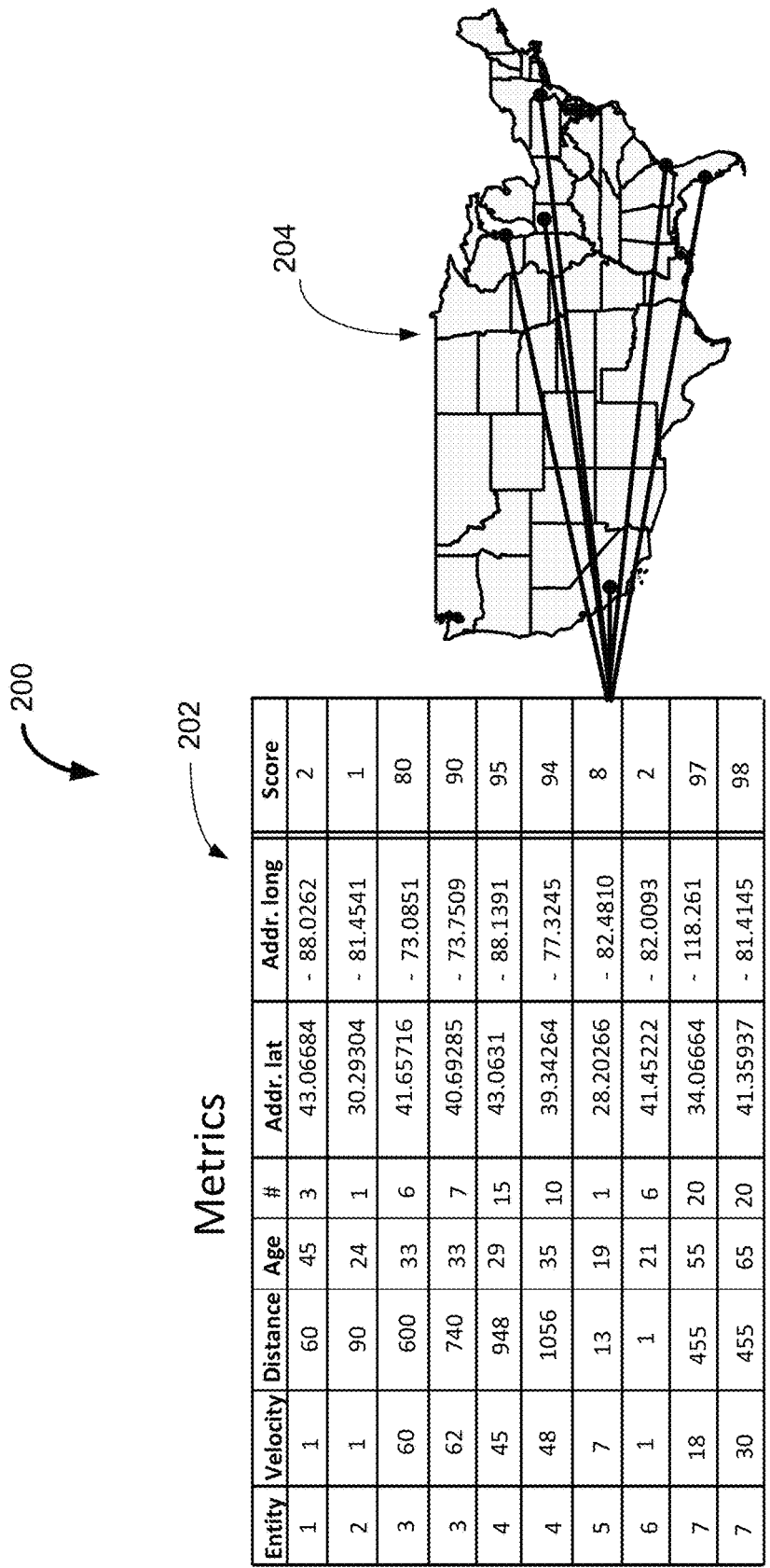
FIG. 2 is a diagram 200 depicting example metrics and scores associated with migrating entities, according to an example embodiment of the disclosed technology.

FIG. 2 is a diagram 200 depicting example metrics and scores associated with migrating entities, according to an example embodiment of the disclosed technology. For example, the entity address/location data may be analyzed to determine metrics 202, such as entity identifiers, a velocity at which entities appear at a location 204; a distance from the entity's previously associated location; a number of entities moving to the same address simultaneously (or within a given time frame); and/or (4) the age of the entity as they emerge at a location.

Certain example implementations of the disclosed technology may be utilized to detect information such as vehicle hoarding, nominee incorporation services, and/or shelf companies. A shelf company, for example, is a company that can be formed in a low-tax, low-regulation state expressly to be sold off for its pristine credit rating. Metaphorically speaking, this type of company may be formed then put on the "shelf" to age with no further activity. In one example scenario, a business person with a bad credit rating, but who needs a loan may purchase a shelf corporation for the purpose of qualifying for and taking out a loan. If the business then defaults on the loan, the creditor can go after a corporation, which may have no assets, no income and no accounts receivable. With the current environment of government bailout of the banks that make questionable loans, the net result is that the public in general may be getting scammed. Thus, detection of such activity is becoming more and more crucial.

Figure 3:
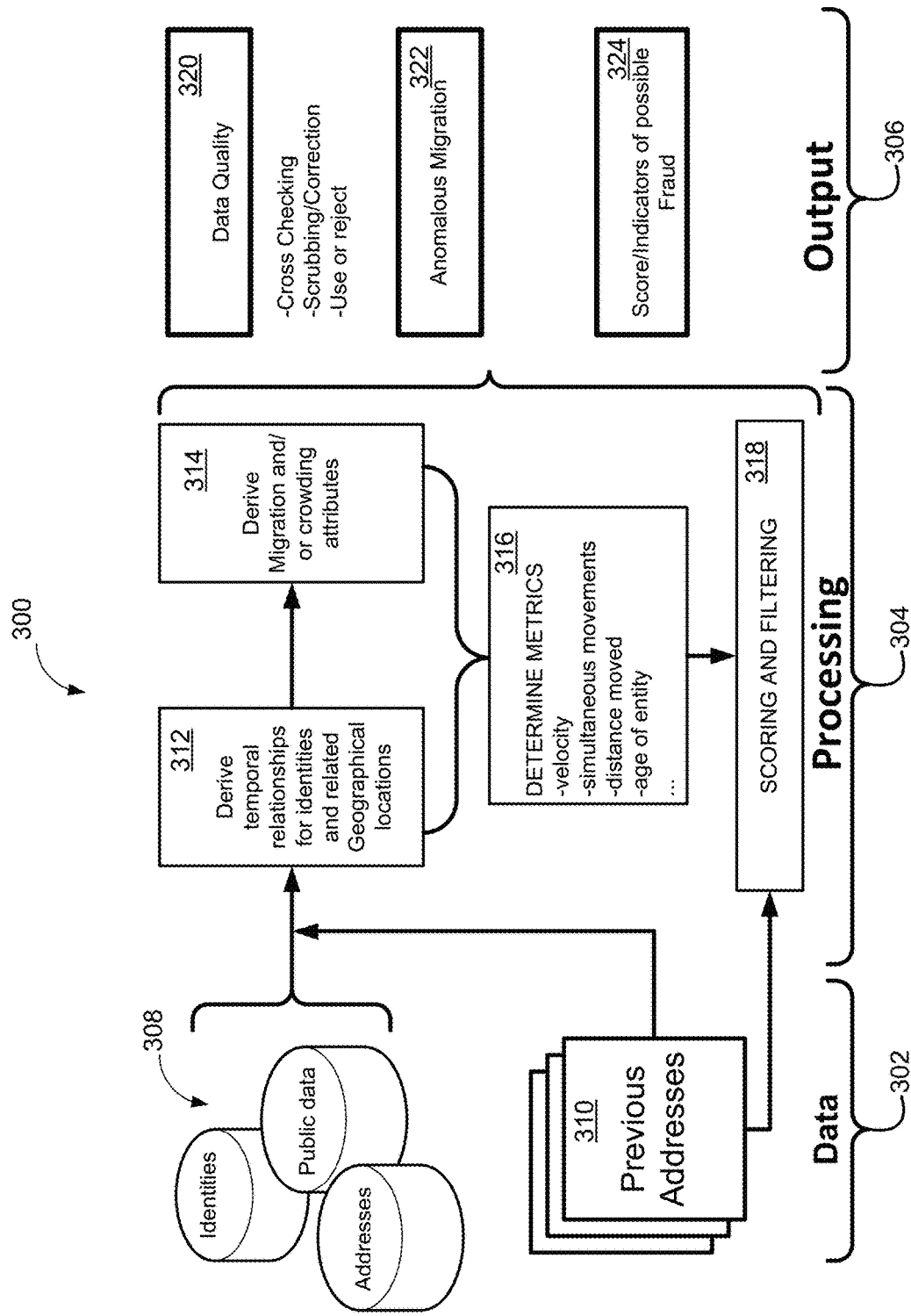
FIG. 3 is an example block diagram of a system 300 for processing and scoring migration data, according to an exemplary embodiment of the disclosed technology.

FIG. 3 is an example block diagram of a migration and crowding analysis system 300 for processing and scoring migration data, according to an exemplary embodiment of the disclosed technology. The migration and crowding analysis system 300 may fetch and/or receive a plurality of data 302 to be analyzed. In certain example implementations, a portion of the data 302 may be stored locally. In certain example implementations, all or a portion of the data may be available via one or more local or networked databases 308. In accordance with an example embodiment, the data 302 may be processed 304, and output 306 may be generated. In one example embodiment, the data 302 may include identities, public data, addresses associated with the identities. In certain example implementations, the data 302 may include previous address information 310 associated with some or all of the identities, including but not limited to time-frames in which particular addresses are associated with corresponding identities.

In certain example implementations, the data 302 may also include information related to one or more activities and/or locations associated with the activities. In an example embodiment, the system 300 may receive the data 302 in its various forms and may process 304 the data 302 to derive temporal relationships and related geographical locations 312. In certain example implementations, the relationships may be utilized to derive migration and/or crowding attributes 314. In an example embodiment, the relationships 312 and attributes 314 may be used to determine particular metrics 316. For example, the metrics 316 may include one or more of the following: velocity of movement, simultaneous movements, distance moved, and age of the entity (associated with the identity). In certain example implementations, the metrics 316 may include one of more of: proximity to the one or more activities, entity information including history, distances, number of overlaps, relations, employer record, license records, etc.

According to an example embodiment of the disclosed technology, the metrics 316 may be processed by a scoring and filtering process 318, which may result in an output 306 that may include one or more indicators of data quality 320, anomalous migration 322, and/or fraud scores 324.

Certain example implementations of the disclosed technology may enable identification of errors in data. For example, data provided by information vendors can include errors that, if left undetected, could produce erroneous results. Certain example implementations of the disclosed technology may be used to measure the accuracy and/or quality of the available data, for example by cross-checking, so that the data be included, scrubbed, corrected, or rejected before utilizing such data in the full analysis. In accordance with an example embodiment of the disclosed technology, such data quality 320 may be determined and/or improved by one or more of cross checking, scrubbing to correct errors, and scoring to use or reject the data.

In accordance with an example implementation of the disclosed technology, connections and degrees of separation between entities may be utilized. For example, the connections may include a list of names of known or derived business associates, friends, relatives, etc. The degrees of separation may be an indication of the strength of the connection. For example, two people having a shared residence may result in a connection with a degree of 1. In another example implementation, two people working for the same company may have a degree of 2. In one example implementation, the degree of separation may be inversely proportional to the strength of the connection. In other example embodiments, different factors may be contribute to the degree value, and other values besides integers may be utilized to represent the connection strength.

According to an example embodiment, anomalous migration 322 may be determined based on temporal geographical location information combined with other metrics 316. For example, the geographical information may include one or more of an address, GPS coordinates, latitude/longitude, physical characteristics about the area, whether the address is a single family dwelling, apartment, etc.

In an example implementation, the output 305 may include weightings that may represent information such as geographical spread of an individual's social network. In an example implementation, the weighting may also include a measure of connections that are in common. Such information may be utilized to vary the output.

According to an example implementation of the disclosed technology, scoring 324 may be applied, and one or more scores may be applied to each address. In an example implementation, a scoring unit may utilize a predetermined scoring algorithm for scoring some or all of the data. In another example implementation, the scoring unit may utilize a dynamic scoring algorithm for scoring some or all of the data. The scoring algorithm, for example, may be based on seemingly low-risk events that tend to be associated with organizations, such as fraud organizations. The algorithm may thus also be based on research into what events tend to be indicative of fraud in the industry or application to which the system 300 is directed.

In accordance with an example implementation of the disclosed technology, the migration and crowding analysis system 300 may leverage publicly available data as input data 308, which may include several hundred million records. The migration and crowding analysis system 300 may also clean and standardize data to reduce the possibility that matching entities are considered as distinct. Before creating a graph, the migration and crowding analysis system 300 may use this data to build a large-scale network map of the population in question and its associated migration.

According to an example implementation, the migration and crowding analysis system 300 may leverage a relatively large-scale of supercomputing power and analytics to target organized collusion. Example implementation of the disclosed technology of the systems and methods disclosed herein may rely upon large scale, special-purpose, parallel-processing computing platforms to increase the agility and scale of solutions.

Example implementations of the disclosed technology of the systems and methods disclosed herein may measure behavior, activities, and/or relationships to actively and effectively expose syndicates and rings of collusion. Unlike many conventional systems, the systems and methods disclosed herein need not be limited to activities or rings operating in a single geographic location, and it need not be limited to short time periods. The systems and methods disclosed herein may be used to determine whether migration and/or crowding activities fall within an organized ring or certain geographical location.

In one example implementation, a filter may be utilized to reduce the data set to identify groups that evidence the greatest connectedness based on the scoring algorithm. In one example implementation, systems and methods disclosed herein may utilize scores that match or exceed a predetermined set of criteria may be flagged for evaluation. In an example implementation of the disclosed technology, filtering may utilize one or more target scores, which may be selected based on the scoring algorithm. In one example implementation, geo-social networks having scores greater than or equal to a target score may be flagged as being potentially collusive.

Figure 4:
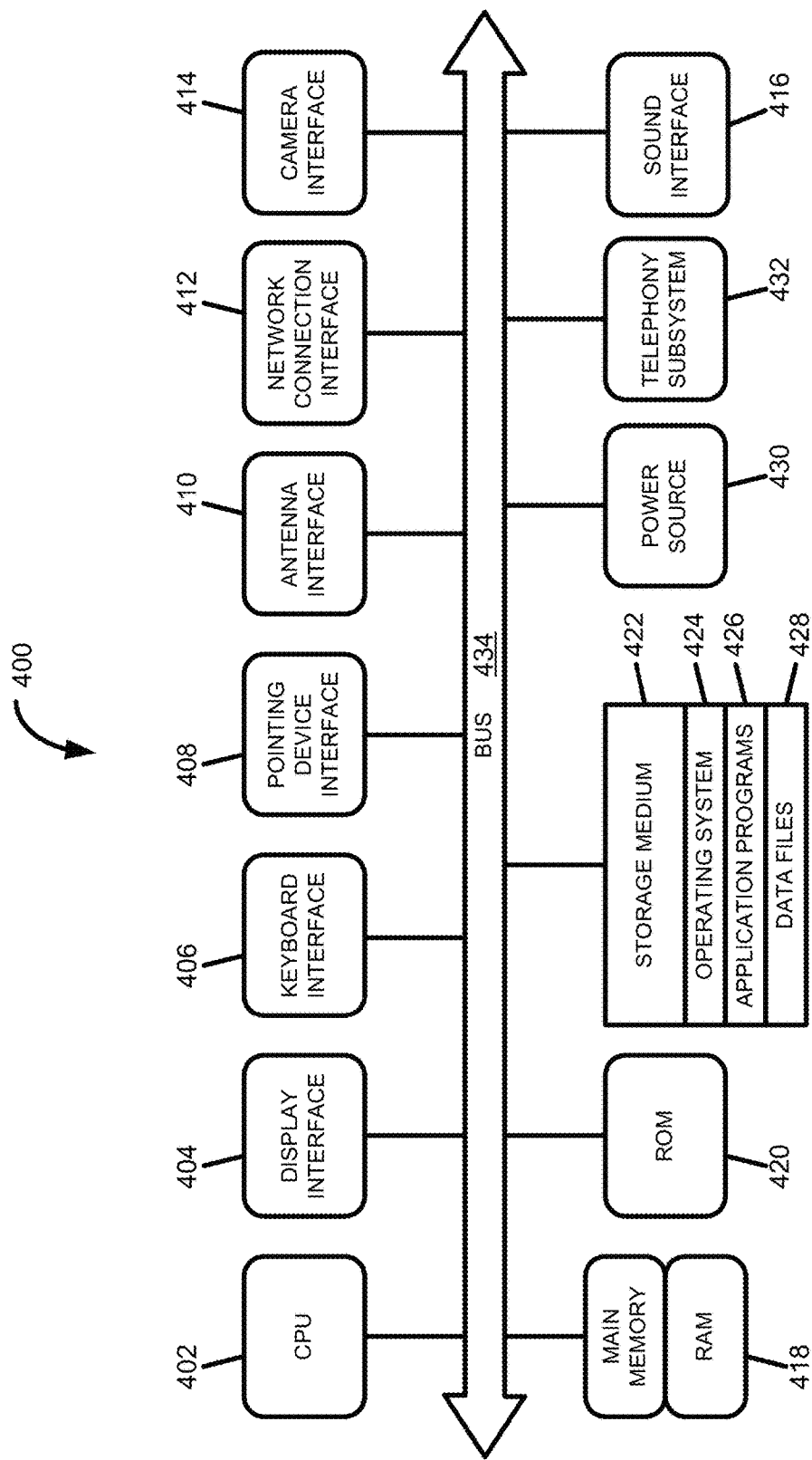
FIG. 4 is a block diagram 400 of an illustrative special-purpose computer system, according to an exemplary embodiment of the disclosed technology.

FIG. 4 depicts a computing device or computing device system 400, according to various example implementations of the disclosed technology. It will be understood that the computing device 400 is provided for example purposes only and does not limit the scope of the various implementations of the communication systems and methods. In certain example implementations, the computing device 400 may be a specialized HPCC Systems, as developed and offered by LexisNexis Risk Solutions, Inc., the assignee of the disclosed technology. HPCC Systems, for example, provide data-intensive supercomputing platform(s) designed for solving big data problems. Various implementations and methods herein may be embodied in non-transitory computer readable media for execution by a processor.

The computing device 400 of FIG. 4 includes a central processing unit (CPU) 402, where computer instructions are processed; a display interface 404 that acts as a communication interface and provides functions for rendering video, graphics, images, and texts on the display. In certain example implementations of the disclosed technology, the display interface 404 may be directly connected to a local display, such as a touch-screen display associated with a mobile computing device. In another example implementation, the display interface 404 may be configured for providing data, images, and other information for an external/remote display that is not necessarily physically connected to the mobile computing device. For example, a peripheral device monitor may be utilized for mirroring graphics and other information that is presented on a wearable or mobile computing device. In certain example implementations, the display interface 404 may wirelessly communicate, for example, via a Wi-Fi channel or other available network connection interface 412 to the external/remote display.

In an example implementation, the network connection interface 412 may be configured as a communication interface and may provide functions for rendering video, graphics, images, text, other information, or any combination thereof on the display. In an example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 400 may include a keyboard interface 406 that provides a communication interface to a keyboard. In an example implementation, the computing device 400 may include a pointing device interface 408, which may provide a communication interface to various devices such as a pointing device, a touch screen, a depth camera, etc.

The computing device 400 may be configured to use an input device via one or more of input/output interfaces (for example, the keyboard interface 406, the display interface 404, the pointing device interface 408, network connection interface 412, camera interface 414, sound interface 416, etc.,) to allow a user to capture information into the computing device 400. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 400 or may be a separate device. For example, the input device may be an accelerometer, a magnetometer, a digital camera, a microphone, and an optical sensor.

Example implementations of the computing device 400 may include an antenna interface 410 that provides a communication interface to an antenna; a network connection interface 412 that provides a communication interface to a network. As mentioned above, the display interface 404 may be in communication with the network connection interface 412, for example, to provide information for display on a remote display that is not directly connected or attached to the system. In certain implementations, a camera interface 414 is provided that acts as a communication interface and provides functions for capturing digital images from a camera. In certain implementations, a sound interface 416 is provided as a communication interface for converting sound into electrical signals using a microphone and for converting electrical signals into sound using a speaker. According to example implementations, a random access memory (RAM) 418 is provided, where computer instructions and data may be stored in a volatile memory device for processing by the CPU 402.

According to an example implementation, the computing device 400 includes a read-only memory (ROM) 420 where invariant low-level system code or data for basic system functions such as basic input and output (I/O), startup, or reception of keystrokes from a keyboard are stored in a non-volatile memory device. According to an example implementation, the computing device 400 includes a storage medium 422 or other suitable type of memory (e.g. such as RAM, ROM, programmable read-only memory (PROM), erasable programmable read-only memory (EPROM), electrically erasable programmable read-only memory (EE- PROM), magnetic disks, optical disks, floppy disks, hard disks, removable cartridges, flash drives), where the files include an operating system 424, application programs 426 (including, for example, KEL (Knowledge Engineering Language), a web browser application, a widget or gadget engine, and or other applications, as necessary) and data files 428 are stored. According to an example implementation, the computing device 400 includes a power source 430 that provides an appropriate alternating current (AC) or direct current (DC) to power components. According to an example implementation, the computing device 400 includes and a telephony subsystem 432 that allows the device 400 to transmit and receive sound over a telephone network. The constituent devices and the CPU 402 communicate with each other over a bus 434.

In accordance with an example implementation, the CPU 402 has appropriate structure to be a computer processor. In an arrangement, the computer CPU 402 may include more than one processing unit. The RAM 418 interfaces with the computer bus 434 to provide quick RAM storage to the CPU 402 during the execution of software programs such as the operating system application programs, and device drivers. More specifically, the CPU 402 loads computer-executable process steps from the storage medium 422 or other media into a field of the RAM 418 in order to execute software programs. Data may be stored in the RAM 418, where the data may be accessed by the computer CPU 402 during execution. In an example configuration, the device 400 includes at least 128 MB of RAM, and 256 MB of flash memory.

The storage medium 422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 400 to access computer-executable process steps, application programs and the like, stored on removable and non-removable memory media, to off-load data from the device 400 or to upload data onto the device 400. A computer program product, such as one utilizing a communication system may be tangibly embodied in storage medium 422, which may comprise a machine-readable storage medium. Certain example implementations may include instructions stored in a non-transitory storage medium in communication with a memory, wherein the instructions may be utilized to instruct one or more processors to carry out the instructions.

According to one example implementation, the term computing device, as used herein, may be a CPU, or conceptualized as a CPU (for example, the CPU 402 of FIG. 4). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

In certain embodiments, the communication systems and methods disclosed herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

Figure 5:
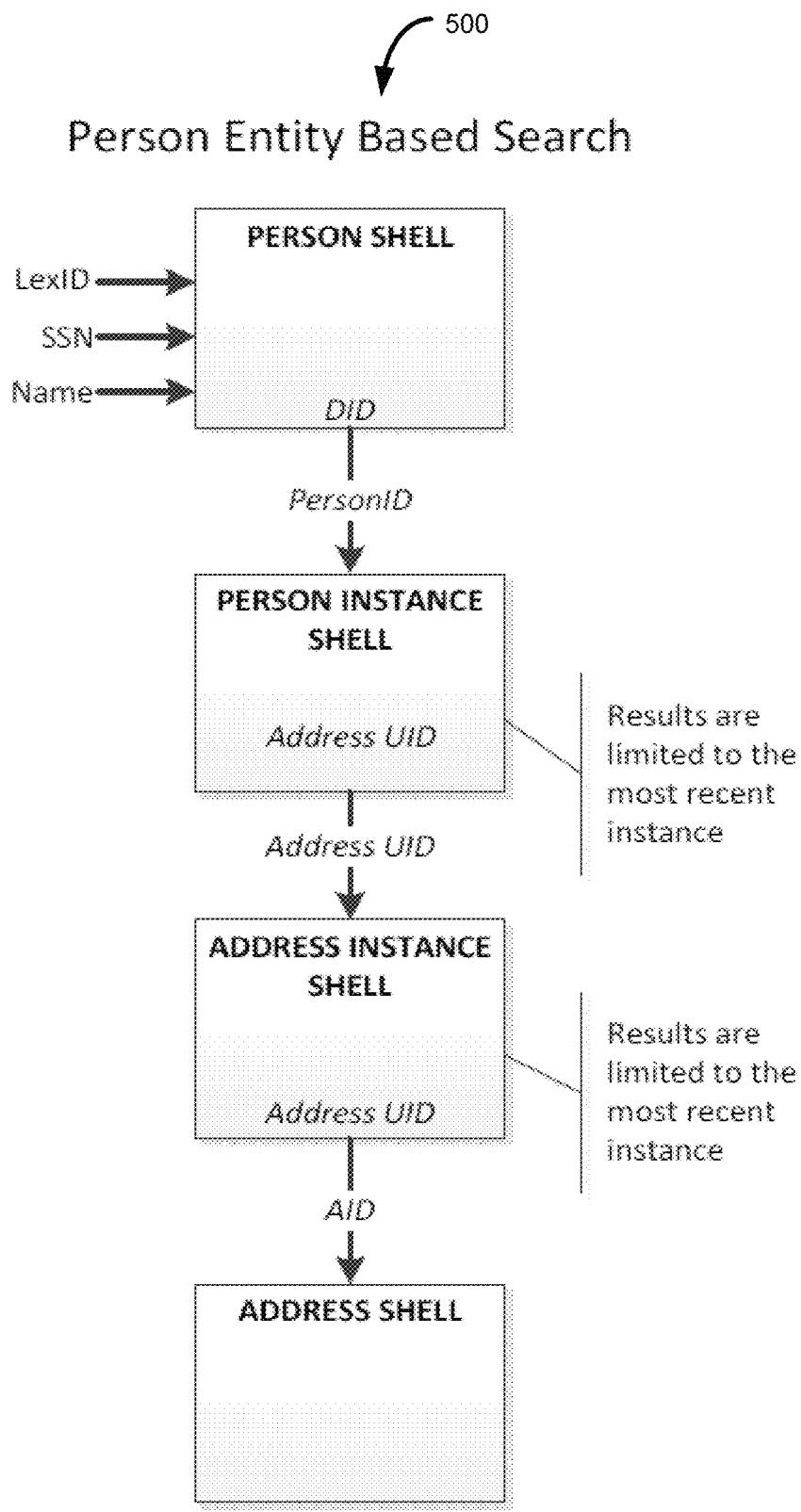
FIG. 5 is a block diagram 500 of an illustrative person entity-based search process, according to an exemplary embodiment of the disclosed technology.
Figure 6:
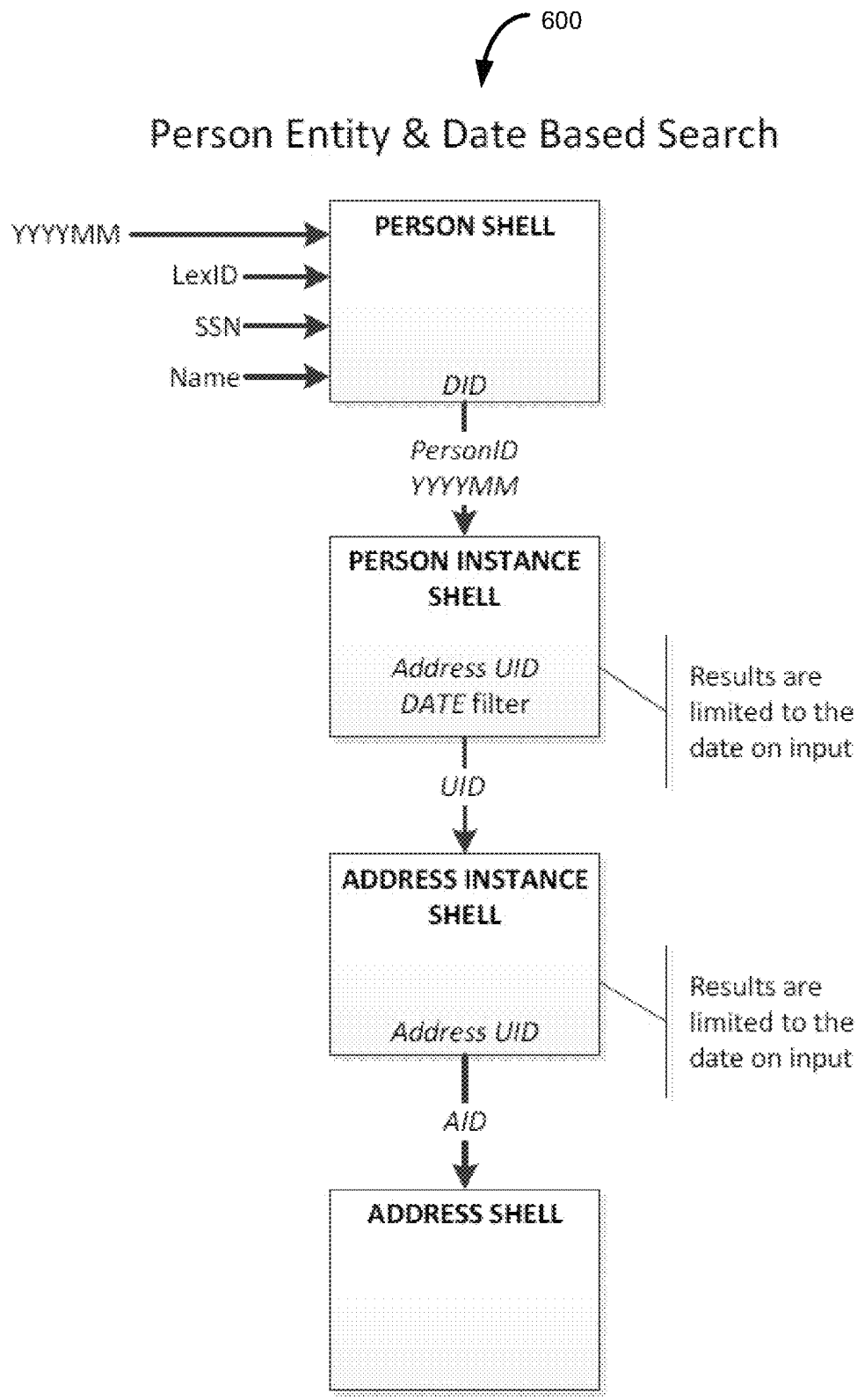
FIG. 6 is a block diagram 600 of an illustrative person entity and date-based search process, according to an exemplary embodiment of the disclosed technology.
Figure 7:
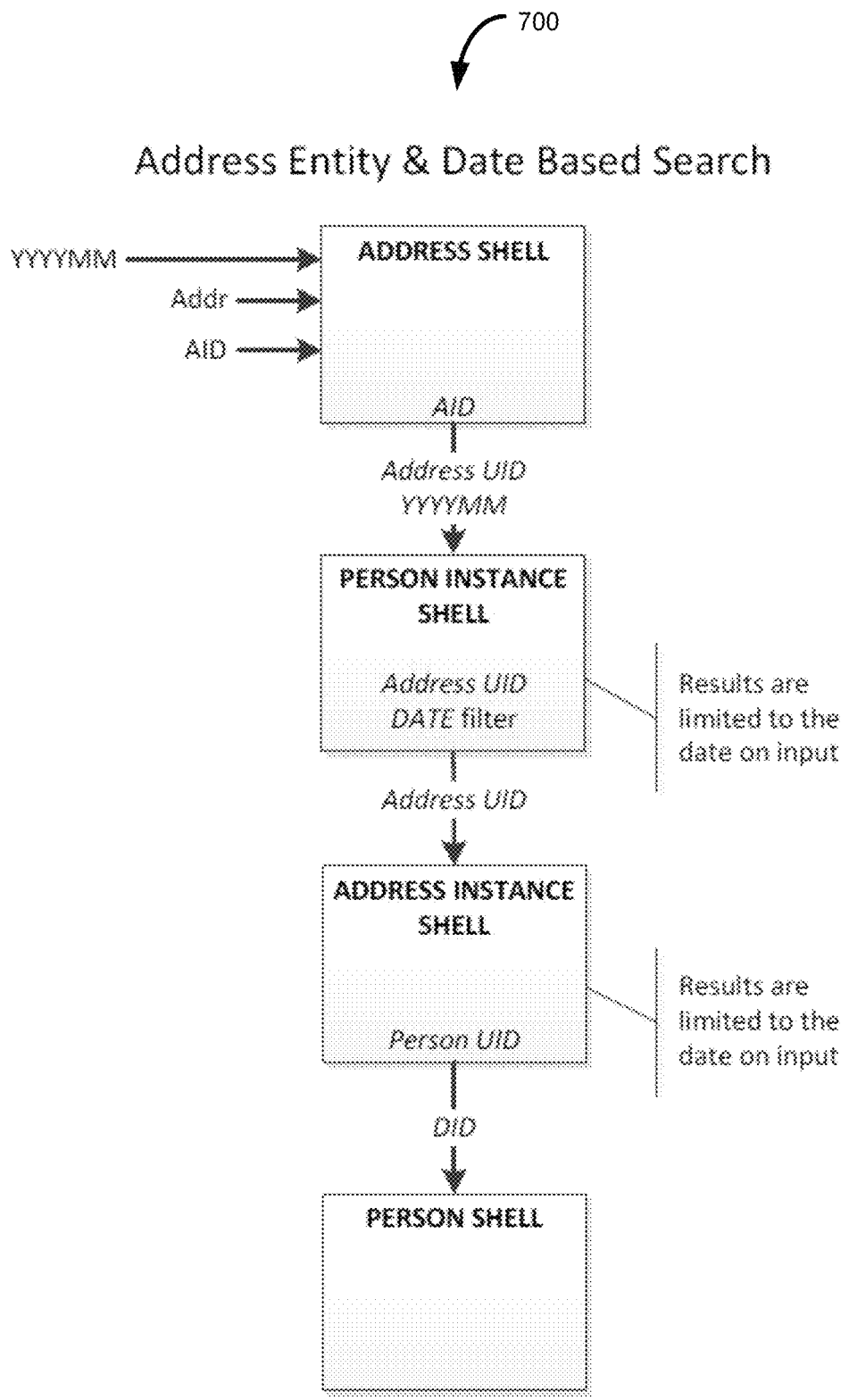
FIG. 7 is a block diagram 700 of an illustrative address entity and date-based search process, according to an exemplary embodiment of the disclosed technology.

FIG. 5, FIG. 6, and FIG. 7 depict various illustrative processes for conducting entity-based searches according to certain example implementations of the disclosed technology. In certain example implementations, a container can include various "shells" to house or represent certain data associated with the person and/or address. As shown in FIG. 5 and FIG. 6, a search process may begin by entering certain identification information into the person shell (such as a unique ID, SSN, name, date, etc.,) and the subsequent stages of the search may be utilized to populate corresponding shells, resulting in an address identification (AID) in the address shell.

According to an example implementation of the disclosed technology, and as depicted in FIG. 7, the search process, as described above, may be reversed by entering certain identification information related to an address (date, address, address ID, etc.) into the address shell, and the subsequent stages of the search may be utilized to populate corresponding shells, resulting in an entity or person identifier (DID) in the person shell.

Certain example implementations of the disclosed technology may utilize combinations of the processes depicted in FIGS. 5-7 to further confirm, refine, and/or reject the data in the various shells.

Figure 8:
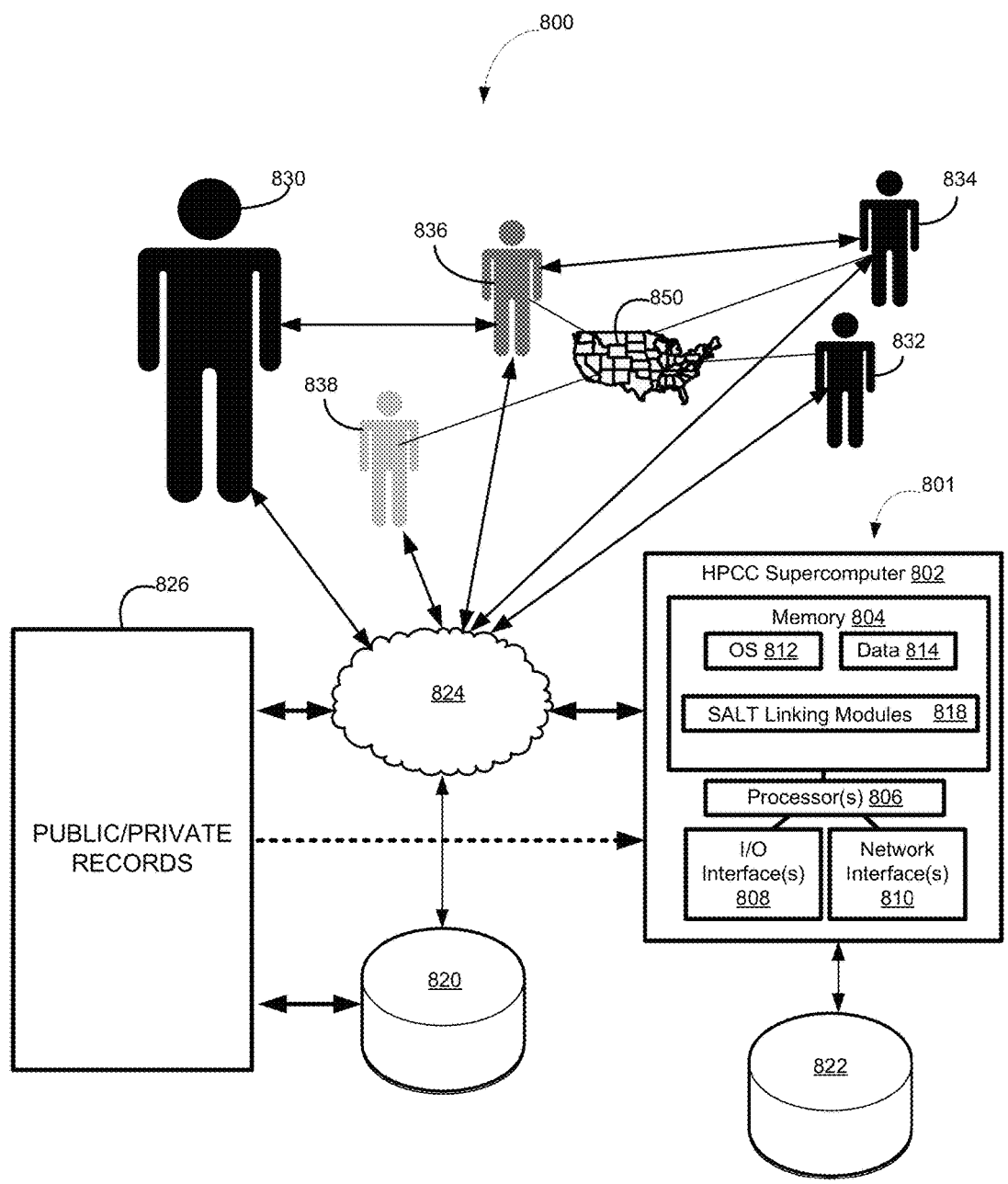
FIG. 8 is a block diagram 800 of an illustrative process for linking information from various data sources, according to an exemplary embodiment of the disclosed technology.

FIG. 8 is a block diagram 800 of an illustrative relationship-linking example and system 801 for determining relationship links between/among individuals. Certain example implementations of the disclosed technology are enabled by the use of a special-purpose HPCC supercomputer 802 and SALT 818, as described above, and as provided with further examples in the APPENDIX.

According to an example implementation of the disclosed technology, the system 801 may include a special-purpose supercomputer 802 (for example HPCC) that may be in communication with one or more data sources and may be configured to process public and/or private records 826 obtained from the various data sources 820 822. According to an exemplary embodiment of the disclosed technology, the computer 802 may include a memory 804, one or more processors 806, one or more input/output interface(s) 808, and one or more network interface(s) 810. In accordance with an exemplary embodiment, the memory 804 may include an operating system 812 and data 814. In certain example implementations, one or more record linking modules, such SALT 818 may be provided, for example, to instruct the one or more processors 806 for analyzing relationships within and among the records 826. Certain example implementations of the disclosed technology may further include one or more internal and/or external databases or sources 820 822 in communication with the computer 802. In certain example implementations, the records 826 may be provided by a source 820 822 in communication with the computer 802 directly and/or via a network 824 such as the Internet.

According to an example implementation of the disclosed technology, the various public and/or private records 826 of a population may be processed to determine relationships and/or connections with a target individual 830. In accordance with an example implementation of the disclosed technology, the analysis may yield other individuals 832 834 836 838 . . . and their associated locations 850 that are directly or indirectly associated with the target individual 830. In certain example implementations, such relationships may include one or more of: one-way relationships, two-way relationships, first degree connections, second degree connections etc., depending on the number of intervening connections.

The example block diagram 800 and system 801 shown in FIG. 8 depicts a first individual 836 that is directly associated with the target individual 830 by a first-degree connection, such as may be the case for a spouse, sibling, known business associate, etc. Also shown, for example purposes, is a second individual 834 who is associated with the target individual 830 via a second degree connection, and who also is connected directly with the first individual 836 by a first degree connections. According to an exemplary embodiment, this type of relationship would tend to add more weight, verification, credibility, strength etc., to the connections. Put another way, such a relationship may strengthen the associated connection so that it may be considered to be a connection having a degree less that one, where the strength of the connection may be inversely related to the degree of the connection.

Various embodiments of the communication systems and methods herein may be embodied in non-transitory computer readable media for execution by a processor. An exemplary embodiment may be used in an application of a mobile computing device, such as a smartphone or tablet, but other computing devices may also be used.

Figure 9:
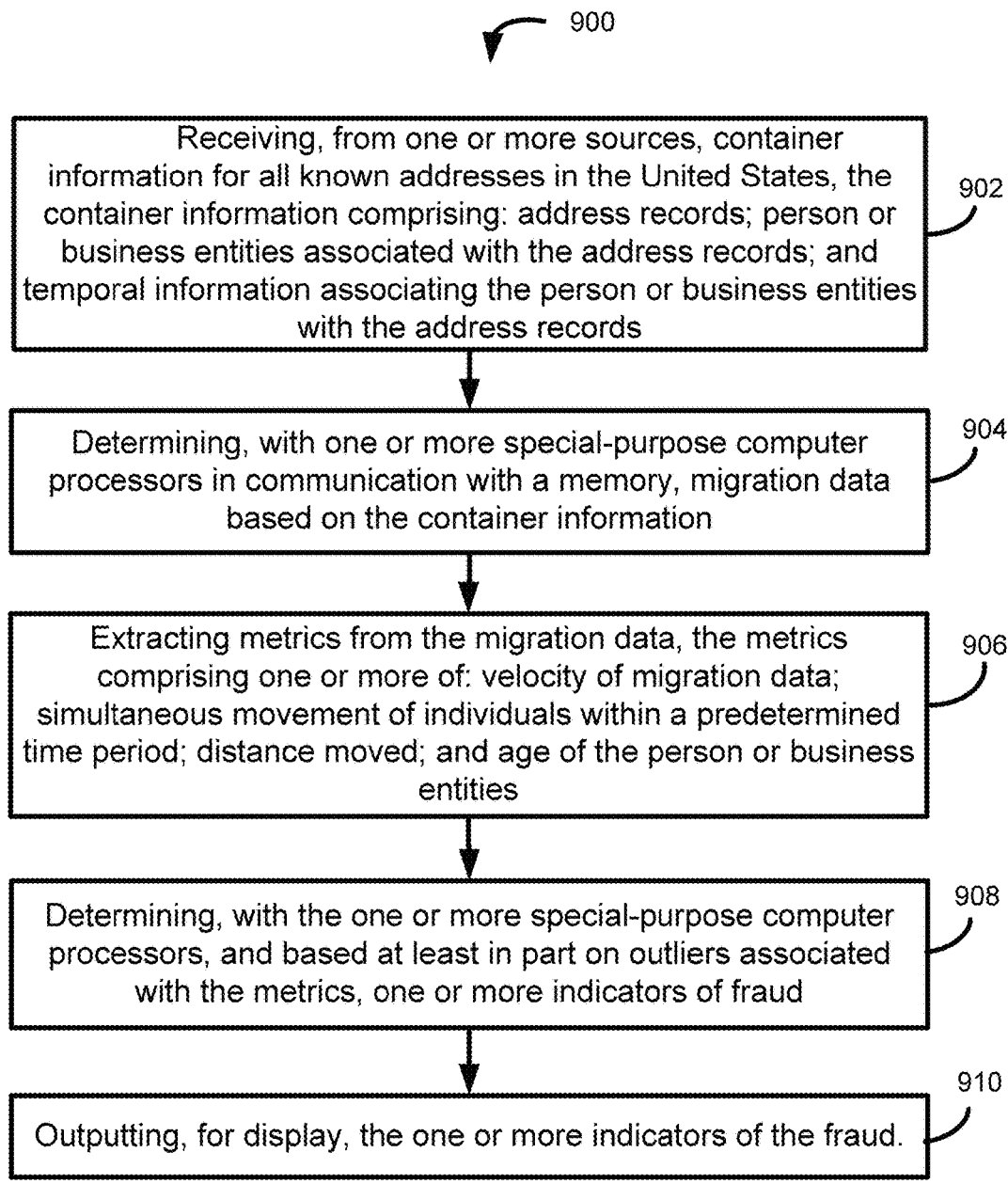
FIG. 9 is a flow diagram of a method 900 according to an exemplary embodiment of the disclosed technology.

An exemplary method 900 for determining a likelihood of identity theft will now be described with reference to the flowchart of FIG. 9. The method 900 starts in block 902, and according to an exemplary embodiment of the disclosed technology, includes receiving, from one or more sources, container information for all known addresses in the United States, the container information comprising: address records; identities associated with the address records; and temporal information associating the identities with the address records. In block 904, the method 900 includes determining, with one or more special-purpose computer processors in communication with a memory, migration data based on the container information. In block 906, the method 900 extracting metrics from the migration data, the metrics comprising on or more of: velocity of migration data; simultaneous movement of individuals within a predetermined time period; distance moved; and age of the identities. In block 908, the method 900 includes determining, with the one or more special-purpose computer processors, and based at least in part on outliers associated with the metrics, one or more indicators of fraud. In block 910, the method 900 includes outputting, for display, the one or more indicators of the fraud.

In certain example implementations, the determined indicators of fraud may relate to identity theft fraud.

According to an example implementation of the disclosed technology, the determining the one or more indicators of fraud can include determining one or more of: a number of person or business entities associated with a single address being greater than a first threshold number; a ratio of the number person or business entities associated with a single address per square footage of the address being greater than a threshold ratio; a number of person or business entities moving to a single address per time-period being greater than a second threshold number; and an association of person or business entities with an address having known previous criminal activity.

In accordance with an example implementation of the disclosed technology, extracting metrics from the migration data can further include extracting activities of the person or business entities related to one or more of: governmental benefits, tax returns, Medicaid, and credit abuse.

In certain example implementations, extracting metrics from the migration data can include extracting activities of the person or business entities related to one or more of: a distance between a current and previous address; and a length of time associated with a previous address.

According to an example implementation of the disclosed technology, the outliers associated with the metrics may correspond to data that differs from a statistical normal by greater than a standard deviation. In another example implementation, the outliers associated with the metrics may correspond to data that differs from a statistical normal by greater than two standard deviations. In another example implementation, the outliers associated with the metrics may correspond to data that differs from a statistical normal by greater than three standard deviations. In another example implementation, the outliers associated with the metrics may be defined with respect to the statistical mean or normal by any desired deviation.

In accordance with an example implementation of the disclosed technology, determining the one or more indicators of fraud can include determining one or more of: an association of person or business entities with vehicle hoarding; an association of person or business entities with nominee incorporation services, and an association of person or business entities with shelf companies.

In certain example implementations, scoring the metrics may be based on or more of: data quality; anomalous migration; groups that evidence the greatest connectedness; events associated with an organization; and possible false positive associations of person or business entities with fraudulent activity.

Certain example embodiments of the disclosed technology may utilize a model to build a profile of indicators of fraud that may be based on multiple variables. In certain example implementations of the disclosed technology, the interaction of the indicators and variables may be utilized to produce one or more scores indicating the likelihood or probability of fraud associated with identity theft.

For example, in one aspect, addresses associated with an identity and their closest relatives or associates may be may be analyzed to determine distances between the addresses. For example, the greater distance may indicate a higher the likelihood of fraud because, for example, a fraudster may conspire with a relative or associate in another city, and may assume that their distance may buffer them from detection.

Certain example embodiments of the disclosed technology may utilize profile information related to an entity's neighborhood. For example, information such as density of housing (single family homes, versus apartments and condos), the presence of businesses, and the median income of the neighborhood may correlate with a likelihood of fraud. For example, entities living in affluent neighborhoods are less likely to be involved with fraud, whereas dense communities with lower incomes and lower presence of businesses may be more likely to be associated with fraud.

Certain example embodiments of the disclosed technology may assesses the validity of the input identity elements, such as the name, street address, social security number (SSN), phone number, date of birth (DOB), etc., to verify whether or not requesting entity input information corresponds to a real identity. Certain example implementations may utilize a correlation between the input SSN and the input address, for example, to determine how many times the input SSN has been associated with the input address via various sources. Typically, the lower the number, then the higher the probability of fraud.

Certain example implementations of the disclosed technology may determine the number of unique SSNs associated with the input address. Such information may be helpful in detecting identity theft-related fraud, and may also be helpful in finding fraud rings because the fraudsters have typically created synthetic identities, but are requesting all payments be sent to one address.

Certain example implementations may determine the number of SSNs associated with the identity in one or more public or private databases. For example, if the SSN has been associated with multiple identities, then it is likely a compromised SSN and the likelihood of fraud increases.

According to an example implementation, the disclosed technology may be utilized to verify the validity of the input address. For example, if the input address has never been seen in public records, then it is probably a fake address and the likelihood of fraud increases Certain example implementations of the disclosed technology may be utilized to determine if the container data corresponds to a deceased person, a currently incarcerated person, a person having prior incarceration (and time since their incarceration), and/or whether the person has been involved in bankruptcy. For example, someone involved in a bankruptcy may be less likely to be a fraudster.

Certain embodiments of the disclosed technology may enable the detection of possible, probable, and/or actual identity theft-related fraud, for example, as associated with a request for credit, payment, or a benefit. Certain example implementations provide for disambiguating input information and determining a likelihood of fraud. In certain example implementations, the input information may be received from a requesting entity in relation to a request for credit, payment, or benefit. In certain example implementations, the input information may be received from a requesting entity in relation to a request for an activity from a governmental agency.

In accordance with an example implementation of the disclosed technology, input information associated with a requesting entity may be processed, weighted, scored, etc., for example, to disambiguate the information. Certain implementations, for example, may utilize one or more input data fields to verify or correct other input data fields.

In an exemplary embodiment, a request for an activity may be received by the system. For example, the request may be for a tax refund. In one example embodiment, the request may include a requesting person's name, street address, and social security number (SSN), where the SSN has a typographical error (intentional or unintentional). In this example, one or more public or private databases may be searched to find reference records matching the input information. But since the input SSN is wrong, a reference record may be returned matching the name and street address, but with a different associated SSN. According to certain example implementations, the input information may be flagged, weighted, scored, and/or corrected based on one or more factors or metrics, including but not limited to: fields in the reference record(s) having field values that identically match, partially match, mismatch, etc, the corresponding field values.

Example embodiments of the disclosed technology may reduce false positives and increase the probability of identifying and stopping fraud based on a customized identity theft-based fraud score. According to an example implementation of the disclosed technology, a model may be utilized to process identity-related input information against reference information (for example, as obtained from one or more public or private databases) to determine whether the input identity being presented corresponds to a real identity, the correct identity, and/or a possibly fraudulent identity.

Certain example implementations of the disclosed technology may determine or estimate a probability of identity theft-based fraud based upon a set of parameters. In an example implementation, the parameters may be utilized to examine the input data, such as name, address and social security number, for example, to determine if such data corresponds to a real identity. In an example implementation, the input data may be compared with the reference data, for example, to determine field value matches, mismatches, weighting, etc. In certain example implementations of the disclosed technology, the input data (or associated entity record) may be scored to indicate the probability that it corresponds to a real identity.

In some cases, a model may be utilized to score the input identity elements, for example, to look for imperfections in the input data. For example, if the input data is scored to have a sufficiently high probability that it corresponds to a real identity, even though there may be certain imperfections in the input or reference data, once these imperfections are found, the process may disambiguate the data. For example, in one implementation, the disambiguation may be utilized to determine how many other identities are associated with the input SSN. According to an example implementation, a control for relatives may be utilized to minimize the number of similar records, for example, as may be due to Jr. and Sr. designations.

In an example implementation, the container data may be utilized to derive a date-of-birth, for example, based on matching reference records. In one example implementation, the derived date-of-birth may be compared with the issue date of the SSN. If the dates of the SSN are before the DOB, then the flag may be appended for this record as indication of fraud.

Another indication of fraud that may be determined, according to an example implementation, includes whether the entity has previously been associated with a different SSN. In an example implementation, a "most accurate" SSN for the entity may be checked to determine whether the entity is a prisoner, and if so the record may be flagged. In an example implementation, the input data may be checked against a deceased database to determine whether the entity has been deceased for more than one or two years, which may be another indicator of fraud.

Queries

According to an example implementation of the disclosed technology, the container data may be subjected to various queries to determine migration and crowding metrics. For example, one or more of the following questions may be posed to assess certain metrics associated with the entity and/or address:

Is this the first time we see this entity?
  How old was this entity when they were first seen in any available records?
  How far did this entity move from their previous address?
  How far did this entity move from any of their previous address?
  How many previous addresses are associated with this entity?
  How long did the entity stay at their previous address before moving to the present address?

Did the entity live at their previous location for longer than 3 years, and then suddenly move to the new location?

How old was the entity when they moved to the new address?

Was the entity deceased prior to moving to the new address? (Zombie)

Was the entity incarcerated prior to moving to the new address?

How many people did the entity live with at the prior address?

How many people are at the new address?

In accordance with an example implementation of the disclosed technology, for each address and month reported, the following questions may be answered to further assess metrics associated with the entity and/or address:

Is the address deliverable, or is it a potentially fake address?

Is the secondary range (apartment number) deliverable?

What is the type of address? (Single family, multi-family, commercial)

How many undeliverable secondary ranges (fake apartments) are connected to this address in a month?

How long have we known about the address?

How is the address population changing over time?

In accordance with an example implementation of the disclosed technology, results of the previous questions may be aggregated to quantify, for each address and each month, the following types of questions:

How many entities have moved to this address?

How many of the entities suddenly moved after living in their previous location for longer than three years?

How many entities are we seeing for the first time ever?

How many of the entities have established identities?

Are most of the entities local or are they moving from far away?

What is the typical age group moving in for the type of accommodation?

How many Zombie identities moved to this address?

In accordance with an example implementation of the disclosed technology, entities may also be segmented by how often they move over time. For example, in certain data sets, 705 of the entities have moved only once, however only 1% of the entities have moved over 17 times. Thus, according to certain implementations, the application of normal statistics may be utilized in detecting outliers and may further provide indicators of fraudulent activity.

Scoring:

In accordance with certain example embodiments of the disclosed technology, a score may be produced to represent how closely input data matches with the reference data. As discussed above, the input data may correspond to the container information associated with a request for a benefit or payment. The reference data, according to an example implementation, may be one or more records, each record including one or more fields having field values, and derived from one or more public or private databases. In certain example implementations, the reference data may be the best data available, in that it may represent the most accurate data in the databases. For example, the reference data may have been cross verified among various databases, and the various records and/or fields may be scored with a validity score to indicate the degree of validity.

In certain example implementations of the disclosed technology, the scores that represent how closely input data matches with the reference data scores may range from 0 to 100, with 0 being worst and 100 being best. In other example implementations, a score of 255 may indicate a null value for the score, for example, to indicate that it is not a valid score and should not be read as indicating anything about the goodness of the match.

According to an example implementation, two types of scores may be utilized: hard scores and fuzzy scores, as known by those of skill in the art. Fuzzy scores, for example are dependent on multiple factors and the same score may mean different things.

In accordance with an example implementation, certain scores may be common across all types of verification scores. For example a "0" may represent a very poor match, or a total mismatch, while a "100" may represent a perfect match. According to an example implementation a "255" may indicate a null (or invalid) comparison. In some cases such a null designation may be due to missing data, either in the input data or in the reference data.

For example, a null in the address score may indicate certain types of invalid addresses or missing information, while a "100" may represent a perfect match across primary and secondary address elements. In certain example implementations of the disclosed technology, a score in the range of "1-90" may be representative of a fuzzy range of scores that mean primary elements of the address disagree in ways ranging from serious to minor. Higher scores are better, with 80 or higher generally considered a "good match," and lower scores increasingly less similar, and with "0" representing a total miss.

According to an example implementation other scores may be dependent on the type of matching being done. For example, with regard to the phone number, a "255" may represent a blank input phone number, a blank reference phone number, or both being blank. In an example implementation, a "100" may indicate that the last 7 digits of the input and reference phone numbers are an exact match, while a "0" may represent any other condition.

With regard to the SSN, and according to an example implementation a "255" may represent a blank input SSN, a blank reference SSN, or both being blank: one side or the other is blank. In an example implementation, if neither of the SSNs (input or reference) are blank, then a computed score may be determined as 100 minus a 'similarity score'. For example, the computed scored may result in a perfect match of "100" if 'similarity score' is 0, and generally speaking, a very close match may result in a computed score of 80 or 90, while a 70 may be considered a possible match.

According to an example implementation, an entity's date of birth (DOB) may be scored by comparing the input data with reference data. In one example implementation the standard format for dates may be represented by a year, month, day format (yyyymmdd). In certain example implementations of the disclosed technology, null values may be referenced or identified by scores of 00 or 01. In an example implementation, a "255" may represent invalid or missing DOB data in the input data, the reference data, or both while a "100" may represent a perfect yyyymmdd match. According to an example implementation, "80" may represent that yyyymm are the same and the day data (dd) is null in the input data, the reference data, or both. According to an example implementation, "60" may represent that yyyymm are the same, but the days are different in the input an reference data, but not null. According to an example implementation, "40" may represent that yyyy are the same, but mmdd in the input data, the reference data, or both is null. According to an example implementation "20" may represent that yyyy are the same, but the in the input data the reference data differ by month and day. Finally a "0" score may represent that there is no match between in the input DOB data and the reference DOB data.

With regard to the name, a "255" may represent a blank input name, a blank reference name, or both being blank, or no first, middle, or last name. Otherwise the score may be computed similarly to SSN. For example, a name match algorithm may be applied to the input and reference names, and the various qualities of matches may range from a perfect match (with a verify score of 100) to a poor match (with a verify score of 50) to no match (with a score of 0).

Scoring Examples

In accordance with an example implementation, a name scoring may be utilized to determine how close the input names (first, middle and last) match to the reference name.

| Input Name | Best Name | Score |
|---|---|---|
| 'RICHARD L TAYLOR', | 'RICHARD L TAYLOR' | 100 |
| 'RICH L TAYLOR', | 'RICHARD L TAYLOR' | 90 |
| 'RICH TAYLOR', | 'RICHARD L TAYLOR' | 80 |
| 'ROD L TAYLOR', another person). | 'RICHARD L TAYLOR' | 0, (believed to be |

In an example implementation, the SSN score may be used to determine how similar the input SSN is to the reference SSN.

| Input SSN | Reference SSN | Score |
|---|---|---|
| 'ABCDEFGHI', | 'ABCDEFGHI', | 100 |
| 'ABCDEFGHZ', | 'ABCDEFGHI', | 90 |
| 'ABCDEFGZZ', | 'ABCDEFGHI', | 80 |
| 'ABCDEFZZZ', | ABCDEFGHI', | 70 |
| 'ABCDEZZZZ', | 'ABCDEFGHI', | 60 |
| 'ABCDZZZZZ', | 'ABCDEFGHI', | 40 |
| 'ZZZZZFGHI', | 'ABCDEFGHI', | 40 |

Certain embodiments of the disclosed technology may enable the detection of possible, probable, and/or actual fraud associated with a request for a payment or a benefit to a governmental agency. Embodiments disclosed herein may provide systems and methods for detecting identity misrepresentation, identity creation or identity usurpation related to the request. According to an example implementation of the disclosed technology, input information, together with information obtained from other sources, such as public or private databases, may be utilized to determine if the container information and related activity is likely to be fraudulent or legitimate.

Certain embodiments of the disclosed technology may enable detection of various requests for payment, benefit, service, refund, etc. from a government agency or entity. The government agency, as referred to herein, may include any government entity or jurisdiction, including but not limited to federal, state, district, county, city, etc. Embodiments of the disclosed technology may be utilized to detect fraud associated with non-government entities. For example, embodiments of the disclosed technology may be utilized by various businesses, corporations, non-profits, etc., to detect fraud.

Metric Examples

Table 1 lists some of the metrics, descriptions, and example relative order of importance with respect to determining indicators of fraud, according to an example implementation of the disclosed technology. In accordance with certain example implementations, such metrics may be utilized for the various tests in conjunction with the flow diagram 600 as shown in FIG. 6. For example, the metric VariationSearchAddrCount may be tested to see if it is associated with >2 addresses, and if so (and perhaps depending on other such tests with other metrics), the record may be flagged as not passing the identity filter test, and thus, may be an indicator of fraud.

TABLE 1

| Example Order of Importance | Metric | Metric Description |
|---|---|---|
| 1 | CorrelationSSNAddrCount | Total number of sources reporting input SSN with input address |
| 2 | AssocDistanceClosest | Distance in miles between identity and closest first-degree relative or associate |
| 3 | SearchUnverifiedAddrCountYear | Number of searches in the last year for the identity using an address that was not on the identity's file at the time of the search |
| 4 | VariationSearchAddrCount | Total number of addresses associated with the identity in searches |
| 5 | AddrChangeDistance | Distance in miles between input address and the most recent unique address |
| 6 | IDVerRiskLevel | Indicates the fraud-risk level based on how well the input components match the information found for the input identity |
| 6a | IDVerSSN | Indicates if the SSN is verified |
| 6b | IDVerName | Indicates if the identity's name is verified |
| 6c | IDVerAddress | Indicates if the input address is verified |
| 6d | IDVerPhone | Indicates if the input phone is verified |
| 7 | DivAddrSSNCount | Total number of unique SSNs currently associated with input address |
| 8 | BankruptcyAge | Time since most recent bankruptcy filing |
| 9 | CorrelationSSNNameCount | Total number of sources reporting input SSN with input name |

TABLE 1-continued

| Example Order of Importance | Metric | Metric Description |
|---|---|---|
| 10 | PBProfile | Profile of purchase activity |
| 11 | VariationSearchSSNCount | Total number of SSNs associated with the identity in searches |
| 12 | ValidationSSNProblems | Indicates SSN validation status-Deceased |
| 13 | CriminalCount | Total criminal convictions |
| 14 | InputAddrNBRHDMultiFamilyCount | Total number of multi-family properties in neighborhood |
| 14a | InputAddrNBRHDSingleFamilyCount | Total number of single family properties in neighborhood |
| 14b | InputAddrNBRHDBusinessCount | Total number of businesses in neighborhood |
| 15 | CurrAddrMedianIncome | Current address neighborhood median income based on U.S. Census data |
| 16 | ValidationAddrProblems | Indicates input address validation status-Invalid |
| 17 | SourceProperty | Indicates if identity is associated with the ownership of real property |
| 18 | InputAddrDelivery | Indicates the delivery sequence status of the input address-Vacant |
| 19 | SearchUnverifiedDOBCountYear | Number of searches in the last year for the identity using a date of birth that was not in the identity's record at the time of search |
| 20 | ArrestAge | Time since most recent arrest |
| 21 | SourceEducation | Indicates if identity attended or is attending college |
| 22 | InputAddrDwellType | Indicates input address dwelling type |
| 23 | AssocHighRiskTopologyCount | Total count of first-degree relatives or associates that are reported from high risk sources |
| 24 | SourceAssets | Indicates if identity is associated with the ownership of assets (vehicles, watercraft, and aircraft) |
| 25 | ValidationSSNProblems | Indicates SSN validation status-Invalid |
| 26 | SourcePhoneDirectoryAssistance | Indicates if identity has a phone listing in Electronic Directory Assistance (EDA) |

According to an example implementation, the one or more parameters may include, but are not limited to: a distance between the container street address and a street address of one or more entity relatives or entity associates; a number of records associating the container SSN and the container street address; a number of unique SSNs associated with the container street address; a number sources reporting the container SSN with the container name; and/or the number of other entities associated with the container SSN.

Certain example implementations further include scoring neighborhood fraud metrics based on the container street address based on one or more of: presence of businesses in the surrounding neighborhood, density of housing in the neighborhood; and median income in the neighborhood.

In an example implementation, determining the validity indication of the entity supplied or container information further includes determining one or more of: whether entity is a child, whether the entity is or has been incarceration record (currently incarcerated, has had prior incarceration, and time since incarceration), whether the entity has been involved in a bankruptcy, and whether the container address is included in public record.

According to an example implementation, the plurality of independent information includes, as applicable: an indication of whether or not the entity is an adult, the age of the entity, independent address information associated with the entity; address validity information associated with the container information; one or more records associated with the container information; or no information.

In certain example implementations of the disclosed technology, receiving the plurality of independent information includes receiving the one or more records comprising one or more of housing records, vehicular records, marriage records, divorce records, hospital records, death records, court records, property records, incarceration records, tax records, and utility records, wherein the utility records comprise one or more of utility hookups, disconnects, and associated service addresses.

In certain example implementations of the disclosed technology, receiving the independent address information or the address validity information includes receiving one or more addresses of relatives or associates of the entity.

In an example implementation, the one or more public or private databases are independent of the government agency.

In an example implementation, receiving the container information includes receiving the name, social security number (SSN), and street address associated with a request for a payment or a benefit from a government agency.

According to exemplary embodiments, certain technical effects are provided, such as creating certain systems and methods that detect fraud related to identity theft. Exemplary embodiments of the disclosed technology can provide the further technical effects of providing systems and methods for determining and eliminating false positives with respect to fraud. Certain example embodiments include technical effects of providing systems and methods for disambiguating input information, resulting in higher quality determinations of fraudulent activities.

In exemplary embodiments of the disclosed technology, the fraud detection system 300 and/or the fraud detection system architecture 400 may include any number of hardware and/or software applications that are executed to facilitate any of the operations. In exemplary embodiments, one or more I/O interfaces may facilitate communication between the fraud detection system 300 and/or the fraud detection system architecture 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the fraud detection system 300 and/or the fraud detection system architecture 400. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the fraud detection system 300 and/or the fraud detection system architecture 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the fraud detection system 300 and/or the fraud detection system architecture 400 with more or less of the components illustrated in FIG. 3, FIG. 4, and FIG. 8.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Numerous specific details have been set forth in this description of the various implementations of the disclosed technology. However, it is to be understood that embodiments of the disclosed technology may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," "implementation," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the terms "entity" and "identity" may mean the same thing.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

APPENDIX

SALT FOR RELATIONSHIP LINKING

**RELATIONSHIP:*relationshipname*:BASIS(*FieldList*):DEDUP(*FieldList*)**
**[:SCORE(*FieldList*)][:TRACK(FieldList)IMULTIPLE(*n*)Ii:SPLIT(*n*)]**
**[:THRESHOLD(*n*)][:BLOCKTHRESHOLD(*n*)]**

**RELATIONSHIP:*relationshipname*:RelationshipList**
**[:MULTIPLE(*n*)] [:THRESHOLD(*n*)] [:BLOCKTHRESHOLD(*n*)]**
[:LINK(NONEIALLIDIRECTICROSS)]

| | |
|---|---|
| *relationshipname* | User-specified logical name for an entity relationship to be computed in the relationship module |
| **BASIS(*fieldlist*)** | Specifies the basis for the relationship using the list of fields specified in the *fieldlist* parameter. The *fieldlist* contains a list of field names separated by a colon ':' character which must be equal between record pairs. Fields specified in the *fieldlist* following a :?: must be equal or null (left.field = right.field or left.field=null or right.field=null). Fields following a :-: implies the fields must not match. Fuzzy matching of fields is not currently supported. |
| **DEDUP(*fieldlist*)** | Specifies a list of field names separated by the colon ':' character for deduping when matching record pairs between clusters to compute the relationship count. The DEDUP prevents overcounting when a cluster contains multiple records containing equal basis fields. Typically the fieldlist is the same as the fixed portion of the BASIS fieldlist. DEDUP fields must be part of the BASIS. |

| | |
|---|---|
| **SCORE(*fieldlist*)** | Specifies an optional list of fields separated by the colon ':' character which will be independently scored once per relationship. Fields following a :-: will be negated for the purpose of computing the threshold. SCORE fields cannot be part of the BASIS. |
| TRACK(fieldlist) | Specifies an optional list of RECORDDATE fields, to be used for tracking the dates over which relationship information is gathered. |
| **MULTIPLE(*n*)** | Specifies the minimum number of entity links n which must occur before a relationship is declared. |
| **SPLIT(*n*)** | Specifies the number of different persists that the main relationship join is split into (default if not specified is 1). Can improve performance and reduce disk space utilization. |
| **THRESHOLD(*n*)** | In SALT relationships are scored the same as internal linking, the same internal linking match threshold must be exceeded for a relationship to be declared (counted). The default threshold is the global default for internal linking. The THRESHOLD(n) parameter allows the default value to be overridden. |
| **BLOCKTHRESHOLD(*n*)** | BLOCKTHRESHOLD can be used to override the default block threshold used to compute relationships (which is five less than the overall default threshold). Lower numbers = more matches and slower times. |
| LINK(NONE\|ALL\|DIRECT\| CROSS | The LINK parameter is used to define how a given relationship is used to create link candidates for internal linking. The default is LINK(ALL). If LINK(NONE) is specified, the relationship will not take part in internal | linking. If LINK(DIRECT) is specified, the relationship will cause the two sides of the relationship to be considered as possibly two halves of the same entity. If LINK(CROSS) is specified, then if D1 r D2 & D1 r D3, then Cross will cause D2 & D3 to be considered as possible entity link candidates. If LINK(A11) is specified, both the DIRECT & CROSS options are evaluated. Note: the relationship basis will be used to SUPPORT the fields of the basis in the matching logic. Thus if you have a BASIS of (fname:lname) — then the NAME concept will be SUPPORTed by whatever the basis score is. This gives a way to get a very strong score for a field match if 2 (or more) relatively weak values for that field match between two entities. (For a fuller explanation of SUPPORT — see ATTRIBUTEFILE)

RelationshipList
The second form of the RELATIONSHIP statement allows a relationship to be formed as the sum of other relationships. The *RelationshipList* parameter allows a list of relationship names separated by the colon ':' character to be specified.

SALT internal linking provides the capability to cluster together records to form an entity. In some situations, the objective is not to determine that two records or clusters are close enough to become part of the same entity, but to determine if a statistically significant link exists between the two clusters and to record this relationship. The RELATIONSHIP statement provides this function.

When clustering single entities using SALT internal linking, there may be insufficient information within one record to perform a link even with propagation of field values. SALT internal linking will leave those records unmatched. Relationships provide a way to record instances when multiple occurrences of specific set of fields (the BASIS field list) matching between clusters provide an additional clue that a match may exist. For example, when a name match isn't strong, but a first name, middle name and two different last names matching between clusters is becoming a lot stronger. Relationships are not currently used automatically as part of SALT linking, however using the RELATIONSHIP statement SALT can produce an additional relationship file that can be used to create an ATTRIBUTEFILE as input to another SALT process. For example, if you have a relationship between entity ID1 and ID2, the relationship file can be deduped and projected so that ID1⊠ID2 and ID2⊠ID1 are both in the file, then use an ATTRIBUTEFILE statement that declares one ID as the IDFIELD and the other ID as the VALUES field. See description below of the output format for a relationship file.

The core part of a SALT relationship is the BASIS; the basis is the list of fields which must be identical between two clusters for a linkage to exist. Fields following a :?: field in the basis field list must be identical or one must be null. Thus a relationship which counts and weighs the number of shared addresses between two clusters could be:

```
RELATIONSHIP:COHABIT:BASIS(PRIMNAME:PRIMRANGE:CITYNAME:ST:?:SECRANGE)
```

Note that the sec-range comes after the :?: that defines that either they must be equal or one must be null.

You can also a ATTRIBUTEFILE VALUES field as part of the BASIS for a relationship.

As it stands this would count all of the record-pairs between two clusters which match, however if a cluster had two or more copies of an address it could double count. To avoid this issue you also specify a DEDUP criteria as a field list to dedup. It would be normal for the DEDUP criteria to be the same as the fixed portion of the basis. However for addresses there can often be multiple names for one road and multiple ways of expressing one city. Thus it is usually safest to simply dedup using the prim_range. For example:

```
RELATIONSHIP:COHABIT:BASIS(PRIM_NAME:PRIM_RANGE:CITY_NAME:ST:?:SEC_RA
NGE):DEDUP(PRIM_RANGE)
```

It should be noted that the DEDUP performs a smart dedup, it will actually look for the strongest link found for a given value of a DEDUP field. In the example presented above, if a link had been found with and without the sec_range it will use the one which includes the sec-range value. If DEDUP is omitted, it defaults to the whole of the basis. SALT also checks to insure that all DEDUP elements are from the BASIS definition.

Within SALT relationship fields are scored the same as in internal linking and by default a linkage is declared if the internal linking match threshold is exceeded. This can be overridden using the THRESHOLD parameter on the RELATIONSHIP statement. As addresses usually have a specificity of around 28 it will generally then take 2 or more to cause a relationship to be declared. If you wish to force that a certain number of different links need to be found between clusters before declaring a relationship then you can use the :MULTIPLE(n) option. Here n is the minimum number of linkages that must have been found. A linkage occurs between any two entity identifiers which share a common value for a given basis.

Sometimes you want to be able to use other information in the record outside of the basis to support the declaration of a linkage but without requiring it as part of the basis. For example, sharing of one address between two identifiers is probably not significant but if the identifiers also share an SSN or share a last name there is more likelihood of a relationship. These supporting fields can be declared using the SCORE parameter on the RELATIONSHIP statement with its associated field list. For example:

```
RELATIONSHIP:COHABIT:BASIS(PRIM_NAME:PRIM_RANGE:CITY_NAME:ST:?:SEC_RA
NGE):DEDUP(PRIMRANGE):SCORE(SSN:LNAME)
```

The fields in the score list are independent and will be maximized across all of the linkages taking part in one relationship (if more than one RELATIONSHIP statement have the same field in the SCORE list, the highest score for that field will be used for all RELATIONSHIP statements).

An issue with relationships is getting them to run in a reasonable amount of time. Relationships are the classical n-squared process and the n-squared is true of both time and disk space. SALT does a lot of work to optimize this process which results in a light-weight self-joins being used in the generated ECL, but disk-space utilization could still be high. The SPLIT(n) parameter on the RELATIONSHIP statement allows the core join to be split into parts each of which is persisted. This has the advantage of breaking a potentially very long join into n parts (allowing others a time slice) but also reduces disk consumption by a factor of n (provided the eventual links are fairly sparse). In terms of performance it should be noted that if n can be made high enough that the output of each join does not spill to disk then the relationship calculation process will have significantly faster performance. The following example shows the use of the SPLIT(n) parameter:

```
RELATIONSHIP:COHABIT:BASIS(PRIM_NAME:PRIM_RANGE:CITY_NAME:ST:?:SEC_RA
NGE):SPLIT(16):SCORE(LNAME:SSN):DEDUP(PRIMRANGE)
```

It is possible to have multiple RELATIONSHIP statements defined in one specification file. Each RELATIONSHIP is independently computed. The output for the relationship specified will be in the following format:

```
CombinationRecord := RECORD
    unsigned6 ID1;
    unsigned6 ID2;
    unsigned2 Basis_score; // Score allocated to the basis
    relationship unsigned2 Dedup_Val; // Hash will be stored in here
    to dedup unsigned2 Cnt; // Number of different basis matches
    shared between // clusters
    unsigned1 LNAME_score; // Independent score for the LNAME field
    unsigned1 SSN_score; // Independent score for the SSN field END;
```

*ID1* and *ID2* are the entity IDs being linked. The *Basis_score* is the accumulated score across all of the (deduped) basis matches that form the relationship. The *Dedup_Val* field is used for computation and may be ignored. *Cnt* is the number of different basis matches being used in the relationship. Then will come a score for each score field which has been maximized across all the basis matches in the relationship. The total score used to determine whether or not the matching threshold is exceeded is *Basisscore+Lnamescore+SSN score.*

Any field (BASIS or SCORE) which is part of a CONCEPT definition will be weighted appropriately when used inside BASIS or SCORE.

Relationships and Dates

It is possible to track the dates over which relationship information is gathered; provided you have RECORDDATE fields in your SPC. Any relationship can have a track list. TRACKing is there to provide date information about the relationship - it does NOT change the relationship computation in any way (other than possibly making it a little slower). For example:

RELATIONSHIP:COHABIT:BASIS(PRIM_NAME:PRIM_RANGE:CITY_NAME:ST:?:SEC_RANGE):SCORE(LNAME:SSN):DEDUP(PRIM_RANGE):THRESHOLD(35):TRACK(dt_first_seen:dt_last_seen)

RELATIONSHIP:CONAME:BASIS(FNAME:LNAME):MULTIPLE(2):TRACK(dt_first_seen:dt_last_seen)

The system will then track for a 'first' date - the first date that BOTH elements of a relationship have a fact. For a 'last' date in is the last date that BOTH elements of a relationship share that fact. If a relationship is based upon multiple co-incidences it will find the earliest shared fact for a 'first' date and the latest shared fact for a last date. This is a slightly weird combination of mins and maxes - but semantically it works. As an example:

A lives at 123 Main Street from 19800101 to 19900101
    B lives at 123 Main Street from 19850101 to 19870101
    A lives at 456 High Street from 19900101 to 20000101
    B lives at 456 High Street from 19870101 to 20100101

The system first computes the 'fact coincidence dates:

A&B share 123 Main Street from 19850101 to 19870101 (the shorter range when both are there)
    A&B share 456 High Street from 19900101 to 200000101 (the shorter range when both are there)

Now the EARLIEST shared fact date is 19850101 and the latest shared fact date is 20000101. These represent an UPPER bound on the start of the relationship and a lower bound on the end of it.

NOTE: if shared facts do NOT overlap in time it is possible for the 'first' date to be after the 'last' date.

It is also possible to enforce some degree of date overlap within a single relationship. This is done by defining a RANGE field upon the two record dates. eg:

```
FIELD:dt_first_seen:RECORDDATE(FIRST,YYYYMM):5,0
FIELD:dt_last_seen:RECORDDATE(LAST,YYYYMM):5,0
RANGEFIELD:ReportedDate:RANGE(dt_first_seen,dt_last_seen):5,0
```

The two record-dates may be TRACKed if required (or not). ReportedDate can now be used as a (fairly) 'regular' field in the basis or score portion of a relationship. eg:

```
RELATIONSHIP:COHABIT:BASIS(PRIM_NAME:PRIM_RANGE:CITY_NAME:ST:?:SEC_RANGE
):SCORE(SSN:LNAME:REPORTEDDATE):DEDUP(PRIM_RANCE):THRESHOLD(35):TRACK(dt
```

```
_first_seen:dt_last_seen)
RELATIONSHIP:CONAME:BASIS(FNAME:LNAME:?:REPORTEDDATE):MULTIPLE(2):TRACK
(dt_first_seen)
RELATIONSHIP:COSSN:BASIS(SSN:REPORTEDDATE):SCORE(LNAME):THRESHOLD(35):TR
ACK(dtlastseen)
```

Notes:

1. In a score the Global specificity for a date overlap is used (same as in internal linking)
2. In the optional portion of a basis - the dates can overlap OR one record not have a date
3. In the fixed portion of a basis - there MUST be overlap in the dates. NOTE: A range field CANNOT be the ONLY (or FIRST) element of a basis

Combining Relationships with Different BASIS into a Single Relationship

It is also possible to define a relationship based upon other relationships. This is done using the relationship list. All relationships in the list must be normal relationships, grandparents are not allowed. This definition uses the second form of the RELATIONSHIP statement. Consider the following example which combines a COHABIT relationship with a COSSN relationship to form an association:

```
RELATIONSHIP:COHABIT:BASIS(PRIM_NAME:PRIM_RANGE:CITY_NAME:ST:?:SEC_RANGE
):SPLIT(16):SCORE(LNAME:SSN):DEDUP(PRIM_RANGE):THRESHOLD(30)
RELATIONSHIP:COSSN:BASIS(SSN):SCORE(LNAME):DEDUP(SSN):MULTIPLE(2)
RELATIONSHIP:ASSOC:COHABIT:COSSN
```

This has two normal relationships and one that associates the other two together into a unified score. It should be noted that because the normal relationships are eventually going to be wired together by an association, you may need to weaken them as shown in the example using the THRESHOLD statement. Thus the THRESHOLD(30) on COHABIT may be enough to capture a very rare single address (40 is the typical person threshold in the LexisNexis person data). For COSSN the MULTIPLE(2) parameter forces pairs of matching SSN for a relationship; this is an efficiency gained from the fact that a single SSN match is already being caught be the SCORE on COHABIT.

In principle ASSOC then simply combines the two underlying relationships together and adds the scores; it is therefore very efficient and uses the stored results of the two normal relationships.

However there is an issue in that between the child relationships there can easily be a lot of double-counting occurring because either:

a) Two relationships have identical fields in the SCORE attribute (in this case both have LNAME)
b) The SCORE attribute of one relationship might be part of the basis of another relationship (in this case COHABIT scores SSN which is part of the basis of COSSN)

SALT automatically picks this apart and:

a) Only picks the best score when multiple SCOREs clash
b) Assigns the SCORE from one relationship to the basis field of the other relationship and then does a MAX across those. (This is how a single SSN match gets picked up even though it is forbidden in COSSN).

Then the MULTIPLE and THRESHOLD parameters (or defaults) are applied to the child relationship. Thus a MULTIPLE(3) will require 3 different data matches to have occurred between COHABIT and COSSN.

A lot of the detail of the child relationships is preserved in the output generated for a combined relationship. The format for the ASSOC example would be:

```
shared ASSOCCRec:= RECORD
    unsigned6 ID1; unsigned6 ID2;
    unsigned2 Total_Score:= 0;
    unsigned2 Total Cnt 0;
    unsigned2 COHABIT_score:= 0;
    unsigned1 COHABIT_cnt:= 0;
    unsigned2 COSSN_score:= 0;
    unsigned1 COSSN_cnt:= 0;
    unsigned1 LNAME_score:= 0;
    // Score for SSN will be rolled into COSSN as it is part of basis
    END
```

Individual keys are also built by SALT for all relationships which are of included as part of another relationship. In addition, a relationship service is built for each relationship that is not the child of another one. This service takes a UID (unique id) and a depth and will produce rolled up data for every relationship in the tree that many levels deep. The *tree walking* aspect of this service is in the *relationship_links* module. The tree is walked so that each level of the tree is joined to the branch before via the strongest link. At each level the IDI is the node being walked from and the ID2 is the node being walked to. The original node appears as a level 0 entry in ID2.

For example, using the *Sample_Input_Fileinternal AF Relationship_SPC* specification file in the SALT Examples module for internal linking produces the following results:

| Result 1 | [2 rows] | Key::salt_test7::bdid::rel:cofcin |
|---|---|---|
| Result 2 | [120 rows] | Key::salt_test7::bdid::rel:assoc |
| Match Sample Records | | |
| Slice Cut Candidates | | |
| Specificities | | |
| SPC Shift | | |
| Pre Clusters | | |
| Post Clusters | | |
| Pre Cluster Count | | |
| Post Cluster Count | | |
| Matches Performed | | 305 |
| Basic Matches Performed | | 132 |
| Slices Performed | | 14 |
| Rule Efficacy | [7 rows] | |
| Confidence Levels | [73 rows] | |
| Propagation Assisted Pcnt | | 17.04918032786885 |
| Propagation Required Pcnt | | 5.573770491803279 |
| Pre Pop Stats | [1 rows] | |
| Post Pop Stats | [1 rows] | |
| Validity Statistics | [1 rows] | |
| Id Consistency4 | [1 rows] | |
| Result 22 | [1 rows] | key::salt_test7::bdid::debug::specificities_debug |
| Result 23 | [148375 rows] | key::salt_test7::bdid::debug::match_candidates_debug |
| Result 24 | [152 rows] | key::salt_test7::bdid::datafile::attribute_matches |
| Result 25 | [437 rows] | key::salt_test7::bdid::debug::match_sample_debug |
| Result 26 | [148375 rows] | key::salt_test7::bdid::datafile::patched_candidates |
| Result 27 | [151475 rows] | temp::bdid::salt_test7::it1 |
| Result 28 | [6620 rows] | temp::bdid::salt_test7::change_it1 |

Result 1 is the file produced by the COFEIN relationship. This file contains the following results:

| | bdid1 | bdid2 | basis score | dedup val | cnt | company name score |
|---|---|---|---|---|---|---|
| 1 | 37178850 | 292680203 | 22 | 54286 | 2 | 11 |
| 2 | 292680203 | 37178850 | 22 | 54286 | 2 | 11 |

Result 2 is the file produced by the top-level relationship called ASSOC. contains the following results:

| | bdid1 | bdid2 | collocate score | collocate cnt | cofein score | cofein cnt | company name score | total cnt | total score |
|---|---|---|---|---|---|---|---|---|---|
| 1 | 28318440 | 81815873 | 12 | 1 | 0 | 0 | 11 | 1 | 23 |
| 2 | 31178850 | 292680203 | 0 | 0 | 22 | 2 | 11 | 2 | 23 |
| 3 | 41434192 | 42443948 | 13 | 1 | 0 | 0 | 11 | 1 | 24 |
| 4 | 42443948 | 41434192 | 13 | 1 | 0 | 0 | 11 | 1 | 24 |
| 5 | 81815873 | 28318440 | 12 | 1 | 0 | 0 | 11 | 1 | 23 |
| 6 | 82061141 | 286051048 | 9 | 1 | 11 | 0 | 8 | 1 | 28 |
| 7 | 176223914 | 387316952 | 12 | 1 | 0 | 0 | 11 | 1 | 23 |
| 8 | 286051048 | 82061141 | 9 | 1 | 11 | 0 | 8 | 1 | 28 |
| 9 | 292680203 | 37178850 | 0 | 0 | 22 | 2 | 11 | 2 | 33 |
| 10 | 387316952 | 176223914 | 12 | 1 | 0 | 0 | 11 | 1 | 23 |
| 11 | 408311407 | 408973906 | 12 | 1 | 0 | 0 | 11 | 1 | 23 |
| 12 | 408973906 | 408311407 | 12 | 1 | 0 | 0 | 11 | 1 | 23 |
| 13 | 427653229 | 994817609 | 10 | 1 | 11 | 0 | 4 | 1 | 25 |
| 14 | 994817609 | 427653229 | 10 | 1 | 11 | 0 | 4 | 1 | 25 |

What is claimed is:

1. A computer-implemented method, comprising:
   receiving, from two or more sources, container information for all known addresses in the United States, the container information comprising:
   address records;
   person or business entities associated with the address records; and
   temporal information associating the person or business entities with the address records;
   disambiguating the container information to verify or correct the container information obtained from the two or more sources;
   determining, with one or more special-purpose computer processors in communication with a memory, migration data based on the disambiguated container information;
   extracting metrics from the migration data, the metrics comprising one or more of:
   velocity of migration data;
   simultaneous movement of individuals within a predetermined time period;
   distance moved; and
   age of the person or business entities;
   determining, with the one or more special-purpose computer processors, and based at least in part on outliers associated with the metrics, one or more indicators of fraud, wherein determining the one or more indicators of fraud comprises determining a ratio of the number of persons or business entities associated with a single address per square footage of the address being greater than a threshold ratio; and
   outputting, for display, the one or more indicators of the fraud.

2. The method of claim 1, wherein the indicators of fraud are related to identity theft fraud.

3. The method of claim 1, wherein determining the one or more indicators of fraud comprises determining one or more of:
   a number of person or business entities associated with a single address being greater than a first threshold number;
   a number of person or business entities moving to a single address per time-period being greater than a second threshold number; and
   an association of person or business entities with an address having known previous criminal activity.

4. The method of claim 1, wherein extracting metrics from the migration data further comprises extracting activities of the person or business entities related to one or more of: governmental benefits, tax returns, Medicaid, and credit abuse.

5. The method of claim 1, wherein extracting metrics from the migration data further comprises extracting activities of the person or business entities related to one or more of: a distance between a current and previous address; and a length of time associated with a previous address.

6. The method of claim 1, wherein the outliers associated with the metrics correspond to data that differs from a statistical normal by greater than a standard deviation.

7. The method of claim 1, wherein determining the one or more indicators of fraud comprises determining one or more of:
   an association of person or business entities with vehicle hoarding;
   an association of person or business entities with nominee incorporation services, and
   an association of person or business entities with shelf companies.

8. The method of claim 1, further comprising scoring the metrics based on or more of:
   data quality;
   anomalous migration;
   groups that evidence the greatest connectedness;
   events associated with an organization; and
   false positive association of person or business entities with fraudulent activity.

9. A system comprising:
   at least one memory for storing data and computer-executable instructions; and
   at least one special-purpose processor configured to access the at least one memory and further configured to execute the computer-executable instructions to:
   receive, from two or more sources, container information for all known addresses in the United States, the container information comprising:
   address records;
   person or business entities associated with the address records; and
   temporal information associating the person or business entities with the address records;
   disambiguate the container information to verify or correct the container information obtained from the two or more sources;
   determine migration data based on the disambiguated container information;
   extract metrics from the migration data, the metrics comprising one or more of:
   velocity of migration data;
   simultaneous movement of individuals within a predetermined time period;
   distance moved; and
   age of the person or business entities;
   determine, based at least in part on outliers associated with the metrics, one or more indicators of fraud, wherein determining the one or more indicators of fraud comprises determining a ratio of the number of persons or business entities associated with a single address per square footage of the address being greater than a threshold ratio; and
   output, for display, the one or more indicators of the fraud.

10. The system of claim 9, wherein the indicators of fraud are related to identity theft fraud.

11. The system of claim 9, wherein the one or more indicators of fraud comprises one or more of:
    a number of person or business entities associated with a single address being greater than a first threshold number;
    a number of person or business entities moving to a single address per time-period being greater than a second threshold number; and
    an association of person or business entities with an address having known previous criminal activity.

12. The system of claim 9, wherein the metrics further comprises activities of the person or business entities related to one or more of: governmental benefits, tax returns, Medicaid, and credit abuse.

13. The system of claim 9, wherein metrics from the migration data further comprises activities of the person or business entities related to one or more of: a distance between a current and previous address; and a length of time associated with a previous address.

14. The system of claim 9, wherein the outliers associated with the metrics correspond to data that differs from a statistical normal by greater than a standard deviation.

15. The system of claim 9, wherein the one or more indicators of fraud comprises one or more of:
an association of person or business entities with vehicle hoarding;
an association of person or business entities with nominee incorporation services, and
an association of person or business entities with shelf companies.

16. The system of claim 9, wherein the at least one special-purpose processor is configured to execute the computer-executable instructions to score the metrics based on or more of:
data quality;
anomalous migration;
groups that evidence the greatest connectedness;
events associated with an organization; and
false positive association of person or business entities with fraudulent activity.

17. A non-transitory computer-readable media comprising computer-executable instructions that, when executed by one or more processors, configure the one or more processors to perform the method of:
receiving, from two or more sources, container information for all known addresses in the United States, the container information comprising:
address records;
person or business entities associated with the address records; and
temporal information associating the person or business entities with the address records;
disambiguating the container information to verify or correct the container information obtained from the two or more sources;
determining, with one or more special-purpose computer processors in communication with a memory, migration data based on the disambiguated container information;
extracting metrics from the migration data, the metrics comprising one or more of:
velocity of migration data;
simultaneous movement of individuals within a predetermined time period;
distance moved; and
age of the person or business entities;
determining, with the one or more special-purpose computer processors, and based at least in part on outliers associated with the metrics, one or more indicators of fraud, wherein determining the one or more indicators of fraud comprises determining a ratio of the number of persons or business entities associated with a single address per square footage of the address being greater than a threshold ratio; and
outputting, for display, the one or more indicators of the fraud.

18. The computer-readable media of claim 17, wherein the indicators of fraud are related to identity theft fraud.

19. The computer-readable media of claim 17, wherein determining the one or more indicators of fraud comprises determining one or more of:
a number of person or business entities associated with a single address being greater than a first threshold number;
a number of person or business entities moving to a single address per time-period being greater than a second threshold number; and
an association of person or business entities with an address having known previous criminal activity.

20. The computer-readable media of claim 17, wherein the computer-executable instructions configure the one or more processors to score the metrics based on or more of:
data quality;
anomalous migration;
groups that evidence the greatest connectedness;
events associated with an organization; and
false positive association of person or business entities with fraudulent activity.

* * * * *